(12) United States Patent
Shank et al.

(10) Patent No.: US 6,470,248 B2
(45) Date of Patent: Oct. 22, 2002

(54) VEHICLE SUSPENSION CONTROL SYSTEM

(75) Inventors: David Shank, Hersey; Peter Strom, Big Rapids, both of MI (US)

(73) Assignee: Narton Corporation, Reed City, MI (US)

(*) Notice: Subject to any disclaimer, the term of this patent is extended or adjusted under 35 U.S.C. 154(b) by 0 days.

(21) Appl. No.: 09/998,612

(22) Filed: Nov. 30, 2001

(65) Prior Publication Data

US 2002/0035423 A1 Mar. 21, 2002

Related U.S. Application Data

(63) Continuation-in-part of application No. 09/752,262, filed on Dec. 29, 2000, which is a continuation-in-part of application No. 08/878,380, filed on Jun. 18, 1997, now Pat. No. 6,356,075, which is a continuation-in-part of application No. 08/690,029, filed on Jul. 31, 1996, now Pat. No. 5,642,043, which is a continuation of application No. 08/069,127, filed on May 28, 1993, now abandoned, which is a continuation of application No. 07/296,183, filed on Jan. 11, 1989, now Pat. No. 5,216,364.

(51) Int. Cl.[7] .............................................. B60G 11/26
(52) U.S. Cl. ..................... 701/37; 280/6.158; 280/6.157
(58) Field of Search ........................ 701/37; 280/6.157, 280/6.158, 5.514, 5.506, 5.507, 5.51

(56) References Cited

U.S. PATENT DOCUMENTS

| | | | |
|---|---|---|---|
| 2,911,632 A | 11/1959 | Levine et al. ............ 340/870.31 |
| 3,020,527 A | 2/1962 | MacLaren ................ 340/870.32 |
| 3,891,918 A | 6/1975 | Ellis ......................... 324/207.16 |
| 4,064,396 A | 12/1977 | Panerello ........................ 702/86 |
| 4,358,762 A | 11/1982 | Wolf et al. ............. 340/870.35 |
| 4,408,159 A | 10/1983 | Prox ....................... 324/207.12 |
| 4,537,411 A * | 8/1985 | Naramoto ................. 280/5.514 |
| 4,555,120 A | 11/1985 | Frait et al. ................ 280/6.158 |
| 4,742,794 A | 5/1988 | Hagstrom ................... 114/286 |
| 4,804,203 A * | 2/1989 | Glab et al. ................ 280/6.157 |
| 4,839,590 A | 6/1989 | Koski et al. ........... 324/207.21 |
| 4,873,655 A | 10/1989 | Kondraske .................... 702/86 |
| 4,909,536 A | 3/1990 | Hale ........................ 280/6.157 |
| 4,912,397 A | 3/1990 | Gale et al. ................... 324/132 |
| 4,914,610 A | 4/1990 | Shimizu et al. ............... 702/97 |
| 5,017,867 A | 5/1991 | Dumais et al. ......... 324/207.13 |
| 5,031,934 A | 7/1991 | Soltis ....................... 280/6.157 |
| 5,045,785 A | 9/1991 | Hansen .................. 324/207.16 |
| 5,060,959 A | 10/1991 | Davis et al. ............. 280/5.514 |
| 5,322,321 A | 6/1994 | Yopp ....................... 280/6.158 |

OTHER PUBLICATIONS

Automotive Electronics handbook, 1994, pp. 17.6, 17.7, 17.8.
Automotive Handbook (3rd Edition) pp. 560–563.
1994 Cadillac Northstar Series.
Automotive News (Sep. 7, 1992).
Automotive Industries, Feb. 1992.

* cited by examiner

Primary Examiner—William A. Cuchlinski, Jr.
Assistant Examiner—Marthe Marc-Coleman
(74) Attorney, Agent, or Firm—Watts, Hoffman, Fisher & Heinke

(57) ABSTRACT

The present invention is intended for use with a motor vehicle having at least one fluid-pressurized height adjusting member having first and second separable components. Apparatus constructed in accordance with the invention includes an integrated vehicle ride height system control system. The control system includes an electronic output drive signal circuit and input signal interpretation circuit to electronically interface with at least one position sensor. The position sensor provides output signals related to extent of separation of said first and second separable components of the fluid pressurized height adjusting member.

12 Claims, 21 Drawing Sheets

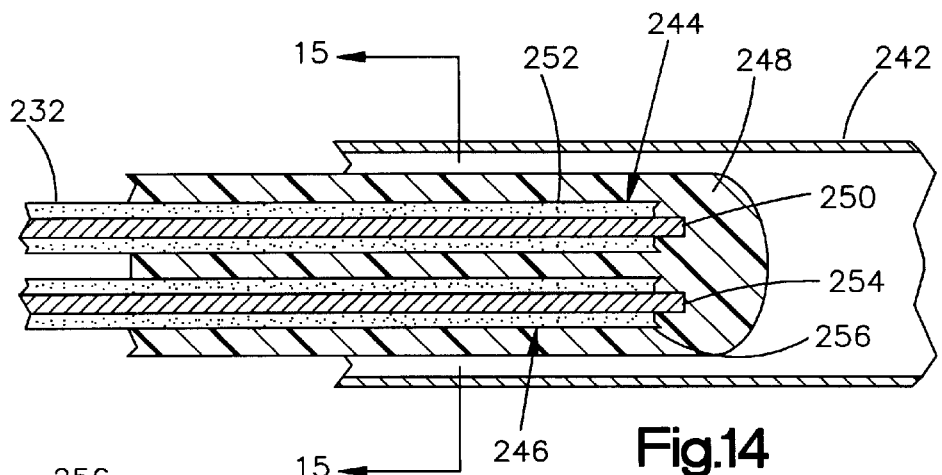
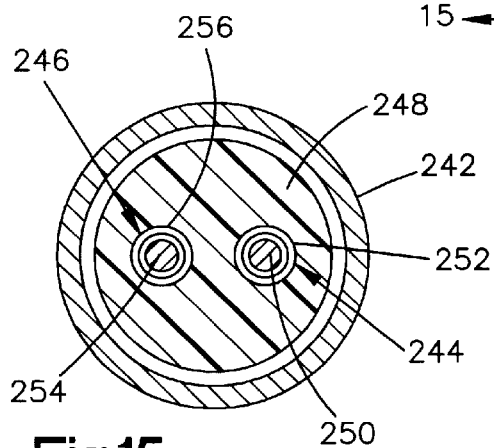
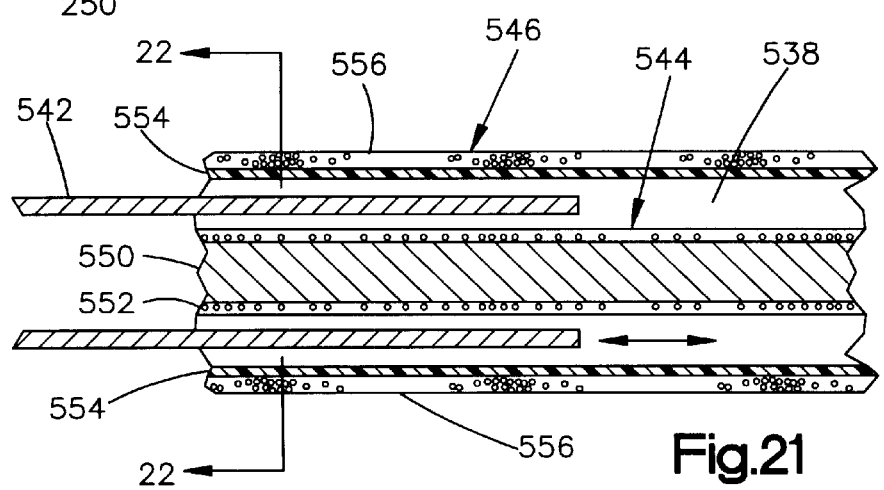
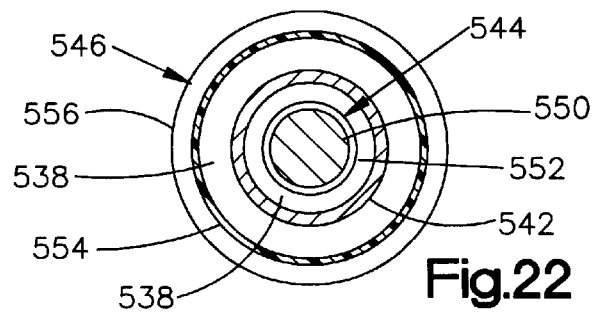

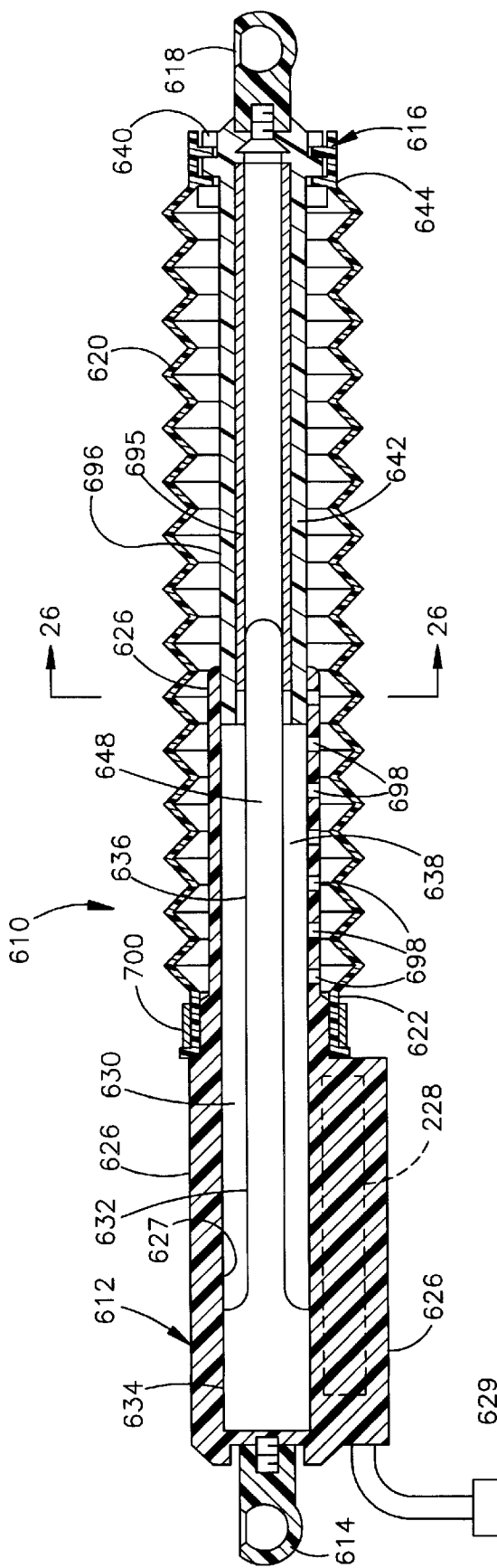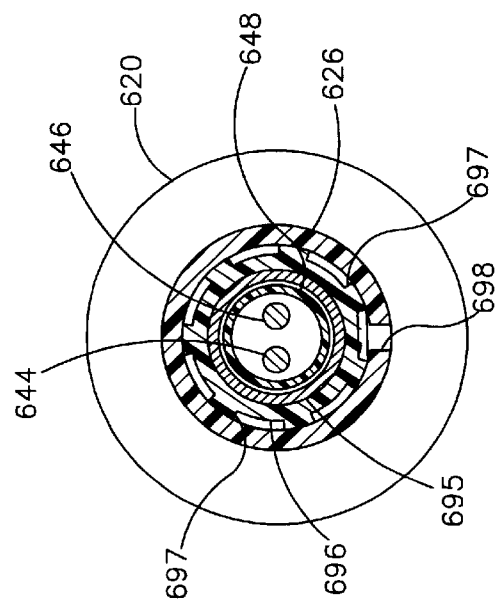
Fig.25
Fig.26

VEHICLE SUSPENSION CONTROL SYSTEM

CROSS REFERENCE TO RELATED APPLICATIONS

The present application is a continuation-in-part of U.S. (1) patent application Ser. No. 09/752,262 entitled "Vehicle Suspension Control System" filed Dec. 29, 2000 which is a continuation-in-part of U.S. (2) patent application Ser. No. 08/878,380, filed Jun. 18, 1997 entitled "Position Sensor System including Voltage Transfer Function" which is a continuation-in-part of patent (3) application Ser. No. 08/690,029 filed Jul. 31, 1996, now U.S. Pat. No. 5,642,043, which is a continuation of (4) application Ser. No. 08/069,127 filed May 28, 1993, now abandoned, which is a continuation of (5) application Ser. No. 07/296,183, filed Jan. 11, 1989, now U.S. Pat. No. 5,216,364 to Ko et al. which is incorporated herein by reference.

FIELD OF THE INVENTION

The present invention concerns an active suspension system for vehicle level control under either manual or automatic control.

BACKGROUND ART

Vehicle suspension systems perform various functions that affect the ride of the motor vehicle. A vehicle suspension system includes various different elements such as springs, shock absorbers, mechanical linkages, and structural members to "suspend" the mass of the motor vehicle.

Springs provide an upward force against the vehicle frame and the force is related to an amount of deformation of the spring. Spring types include coil springs, leaf springs, bar springs, torsion springs and gas springs.

Shock absorbers provide a force related to the rate of change of an extension of the shock absorber component. A typical shock absorber utilizes hydraulic oil to damp motion via fluid flow impedance through at least one flow-restricting orifice. Improved shock absorbers incorporate at least one pressure-actuated valve providing variable damping via multiple orifice and/or variable orifice size to provide variable net damping based upon position and/or dynamic conditions. Gas-assist shock absorbers further incorporate internal gas springs and valves to significantly reduce damping of rebound relative to jounce to reduce rebound time and maintain more average height.

More advanced shock absorbers use electro rheological and magneto rheological fluids with active control of fluid viscosity through an orifice to vary motion damping. Major drawbacks to utilization of electro rheological (ER) fluids include moisture susceptibility, contamination susceptibility, and very high voltage requirements. Response time for magneto rheological (MR) fluids from Lord Corporation is reportedly less than 25 ms to 50 ms. Advantages of MR fluids relative to ER fluids include lower material cost, much lower susceptibility to moisture contamination, and low drive voltage requirements.

Vehicle performance and handling improvements enabled by dynamic stability controls and electronic suspensions are becoming more practical when powered by higher voltages as for example new proposed 42 volt DC supplies. Peak and average power loads reported for a typical active suspension system are 12 KWatt and 360 Watt, respectively. Technological advancements in sensing, computing, suspension mechanisms, fluid power, electrical power, and controls result in various active system control implementations responding to multiple static and dynamic vehicle and suspension unit inputs.

One prior art active suspension (Davis U.S. Pat. No. 5,060,959) for a vehicle includes an electrically powered device acting either alone or in parallel with a static load carrying device such as a fluid spring or coil spring. Another prior art active suspension system (Yopp U.S. Pat. No. 5,322,321) incorporates multiple dual suspension units, each including an electrically powered actuator for slower force adjustments combined with a gas assist spring for faster force adjustments utilized either alone or with other type active suspension systems such as electromagnetic, hydraulic, or hydro pneumatic for actively adapting vehicle ride height. Dynamic suspension systems employ the function of changing spring rate and damping force in accordance with driving conditions and road surfaces.

To overcome limitations of fixed rate damping and spring element systems, unpowered or low-powered systems vary damping rate and/or height in response to relatively slow changes in vehicle load. Because of the inflexibility of fixed rate damping and spring element systems, adaptive control systems have been proposed wherein the spring rates, ride heights, and/or damping rates are varied as a result of criteria such as road inputs, vehicle turning, and vehicle loading.

Static height control systems respond to sensed height to actuate height control when the vehicle is not in motion. Relatively slow actuator response time for such systems takes seconds or tens of seconds. An improvement to basic mechanical spring and shock systems includes slow speed leveling and/or height adjustment actuation of a static vehicle via pneumatic springs either manually or automatically controlled. This adjustment requires that the vehicle be moved to a level location while adjusting gas pressure to gas springs (that supplement metal springs) to move the vehicle to a desired height and/or level attitude. Quantities of gas spring components range from one per vehicle for simple rear end up/down actuation to multiple springs per suspension unit for complete height and level attitude actuation.

Dynamic leveling systems respond to numerous inputs to actuate height control and/or damping control when the vehicle is moving. Faster actuation response times for active suspension systems range from under one hundred milliseconds to several hundreds of milliseconds. Recently adopted mechanical shock absorber valve systems respond and adapt to jounce acceleration in approximately 10 milliseconds. A goal of such systems is a damping response time of less than 7 milliseconds, preferably less than 5 ms. Based upon vehicle speed, one type of vehicle height control system automatically lowers the vehicle height at higher vehicle speeds to lower ground effect wind resistance with resultant improved handling and reduced fuel consumption. A separate feature is a process that increases vehicle body height on rough road surfaces.

Existing active suspension system sensing inputs include a mode select switch, stop lamp switch, door switch, alternator, check terminal, diagnosis clear terminal, vertical height, first derivative of height with respect to time (velocity), second derivative of height with respect to time (acceleration), load force using a load cell, gas pressure, hydraulic pressure, ball screw motor torque via torque sensor or current measurement, motor position encoder, motor position resolver, vehicle speed, throttle position, wheel slippage, wheel sensors, body deflection, angular acceleration, lateral acceleration, chassis pitch, chassis roll, brake sensor, and anti-lock braking system inputs.

One representative prior art patent relating to a vehicle active suspension system is U.S. Pat. No. 5,322,321 to Yopp.

This patent concerns an active suspension system that includes an electrically powered actuator utilized with a height sensor and a gas spring controlled by a gas supply that pressurizes and vents the gas spring to quickly add or remove a predetermined force as needed in assisting the electrically powered actuator.

One embodiment of the present invention utilizes linear position sensors to monitor separation between motor vehicle components. Due to the highly competitive nature of the business of supplying components to the automotive industry, any vehicle based sensor must by reliable, accurate and cost competitive.

A number of prior art patents relate to position sensors. U.S. Pat. No. 3,020,527 to MacLaren concerns a position indicating system and more particularly concerns a telemetric system for indicating the position of a remote or inaccessible means which may be moved to various positions in a simple, convenient, accurate, and reliable manner.

U.S. Pat. No. 4,555,120 to Frait et al. concerns a position sensor which can be utilized as a height sensor in an automatic vehicle suspension system. The structure disclosed in the '120 patent to Frait et al is principally concerned with the sensor structure.

SUMMARY OF THE INVENTION

One embodiment of the present invention concerns a control system for use with a motor vehicle having at least one fluid-pressurized height adjusting member having first and second separable components. Apparatus constructed in accordance with the invention includes a vehicle ride height control system. The control system includes an electronic output drive signal circuit and input signal interpretation circuit to electronically interface with at least one position sensor. In one embodiment of the invention, the position sensor provides output signals related to extent of separation of first and second separable components of the fluid pressurized height adjusting member.

An exemplary control system also includes electronic input and/or output circuitry to interface with at least one fluid pressure sensor which provides output signals related to a fluid-pressurized height-adjusting member.

In one embodiment of the invention, the control system also includes an electronic output circuit which drives output power control for at least one fluid flow valve which applies pressure to the at least one fluid-pressurized height adjusting member to actuate the height adjusting member to raise the vehicle. The exemplary control system also provides an electronic output coupled to at least one fluid flow valve which releases pressure from the fluid-pressurized height adjusting member to lower the vehicle. The control system also includes electronic output circuitry to control a fluid pressure pump to provide system fluid power.

The Exemplary control system includes a programmable controller that implements control algorithms for vehicle height control output functions in response to vehicle input signals.

Position sensing apparatus constructed in accordance with the present invention includes an elongated field producing member having an input for energizing the field producing member to produce an electromagnetic field in the vicinity of the field producing member. A coupling member supported for relative movement with respect to the elongated field producing member alters an output signal from the sensor in response to movement of the coupling member in relation to the field producing member.

These and other objects, advantages and features of the invention will become better understood from the following detailed description of a preferred embodiment of the invention which is described in conjunction with the accompanying drawings.

BRIEF DESCRIPTION OF THE DRAWINGS

FIG. 14 is an enlarged partial view of the area indicated at 14 in FIG. 13;

FIG. 15 is a sectional view taken along the lines 15—15 in FIG. 14;

FIG. 21 is an enlarged view of the area designated 21 in FIG. 20;

FIG. 22 is a sectional view taken along the lines 22—22 in FIG. 21;

FIG. 25 is a sectional side view of a third embodiment of the invention;

FIG. 26 is an enlarged sectional view taken along the lines 26—26 in FIG. 25.

BEST MODE FOR PRACTICING THE INVENTION

Figure 1:
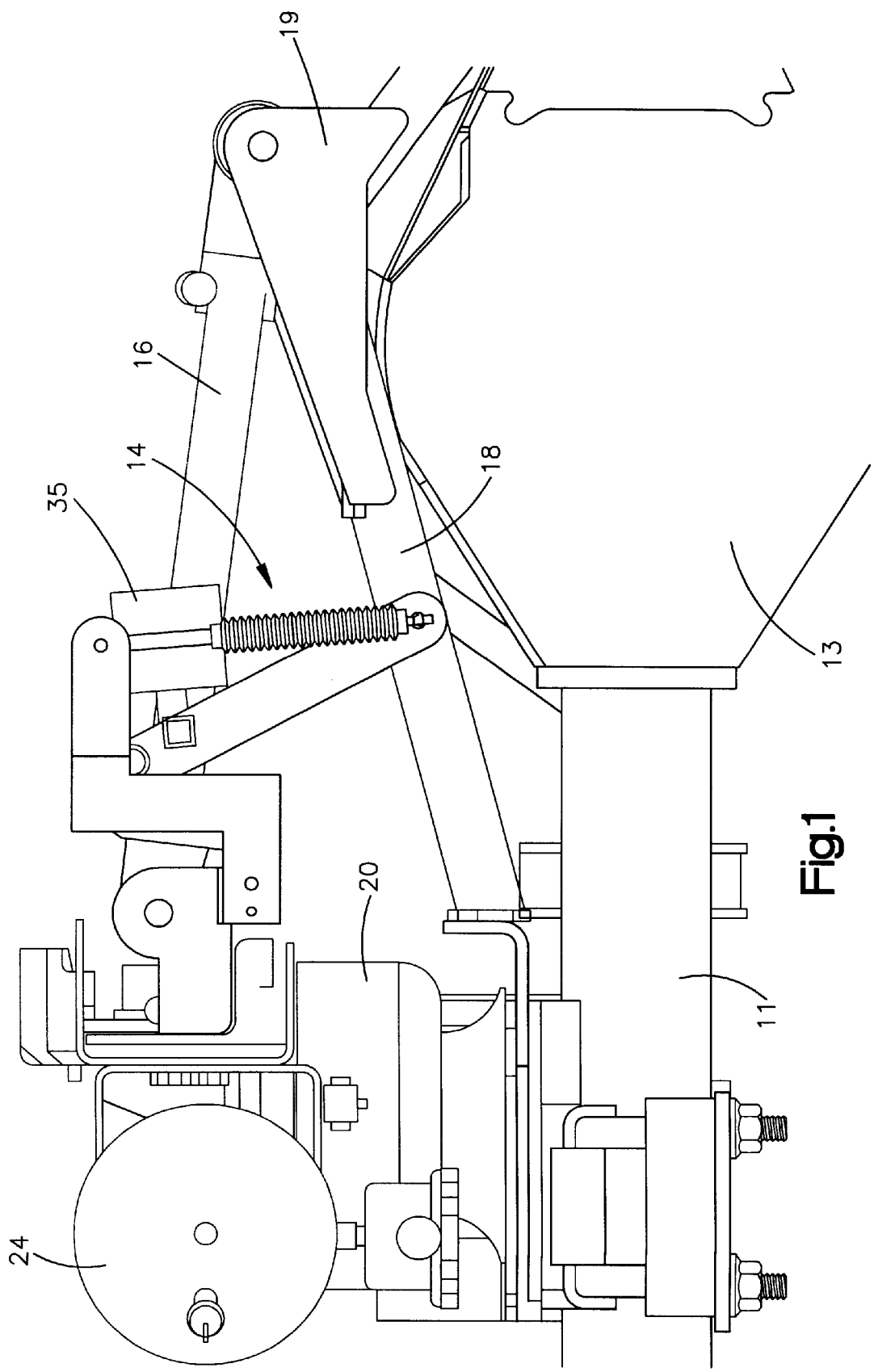
FIG. 1 is a schematic depiction of a pressured gas spring or shock absorber with an external height adjustment sensor for use in accordance with an exemplary embodiment of the invention.

The drawings illustrate an integrated vehicle ride height system control system 10. FIG. 1 is a view from a rear of a vehicle in the vicinity of an axle housing 11 and a differential 13. FIG. 1 also shows a position sensor 14 mounted external to an air spring 20. The position sensor 14 might alternately be directly incorporated within the air spring 20. As depicted in FIG. 1, the position sensor 14 is not connected directly to the air spring 20.

Figure 2:
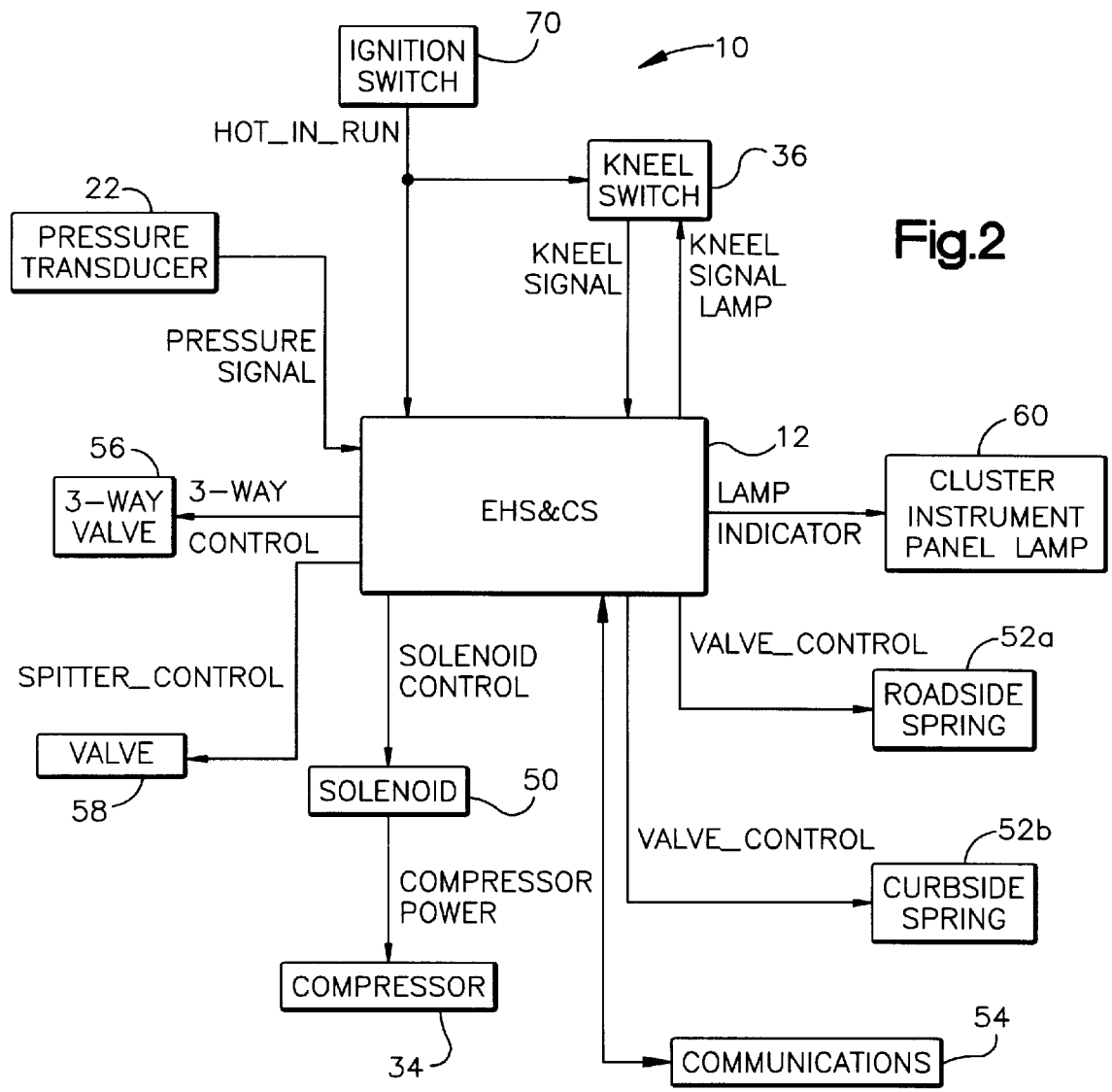
FIGS. 2–4 are schematic depictions of control functions implemented by use of the present invention.
Figure 9:
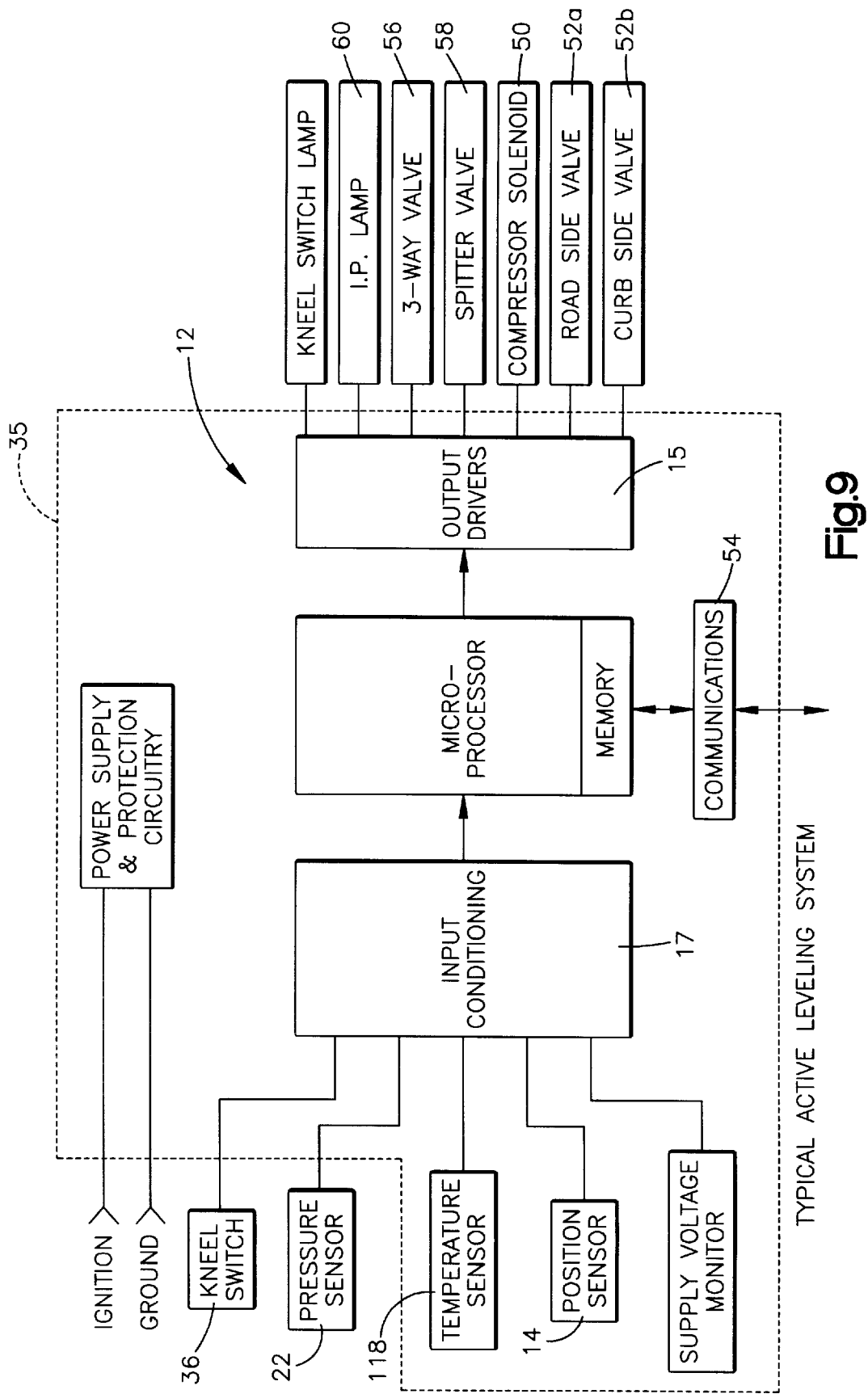
FIG. 9 is a block diagram schematic of a representative system for use with the present invention.

As seen in the functional schematic of FIGS. 2 and 9 the control system 10 includes an electronic output drive signal circuit 15 that forms part of a programmable controller 12 for providing control outputs. The programmable controller 12 also includes an input signal interpretation circuit or interface 17 to monitor input signals from, as one example, the position sensor 14. The position sensor 14 provides output signals to the controller 12 related to the extent of separation of the first and second separable components 16, 18 (FIG. 1) that are pivotally connected to each other at one end of the components 16, 18 attached to a vehicle frame 19. The angular separation between these components 16, 18 and hence the ride height of the vehicle can be controlled by adjusting a pressure within the air bag spring 20. Responses to this movement are monitored by the position sensor 14.

The controller 12 also includes electronic input and/or output circuitry to interface with at least one air pressure sensor 22 (FIGS. 2 and 9) which provides output signals related to a sensed state of an air-pressurized air reservoir 24.

The exemplary control system also includes an electronic output circuitry to drive output power control for at least one air flow valve which selectively applies pressure to the air bag spring 20 to raise the vehicle. The exemplary control system also provides an electronic output coupled to at least one air flow valve which releases pressure from the air bag spring 20 to lower the vehicle. The control system also includes electronic output circuitry to control an air pressure pump or compressor 34 to provide system air power.

The programmable controller 12 constructed in accordance with the exemplary embodiment of the invention also implements control algorithms for vehicle height control output functions in response to vehicle input signals. These control algorithms are depicted in the flow diagrams of FIGS. 4, 4A and 5–8. The controller 12 measures and modifies the height of the vehicle body with respect to the rear axle housing 11. As loading on the vehicle changes due to the presence of passengers, luggage, trailers, and such, the rear of the vehicle is raised or lowered in order to maintain a level vehicle body. The controller 12 also provides a 'kneeling' function which allows the vehicle operator to manually lower the rear of a vehicle for easy disconnection of a trailer, etc.

The position sensor 14 is most preferably constructed using an elongated wound coil including a signal control member that overlaps a portion of the coil. A representative sensor would include for example structure constructed in accordance with the teaching of U.S. Pat. No. 5,642,043 to Ko et al. The contents of this '043 patent to Ko et al. is incorporated herein by reference.

Controller Overview

Figure 3:
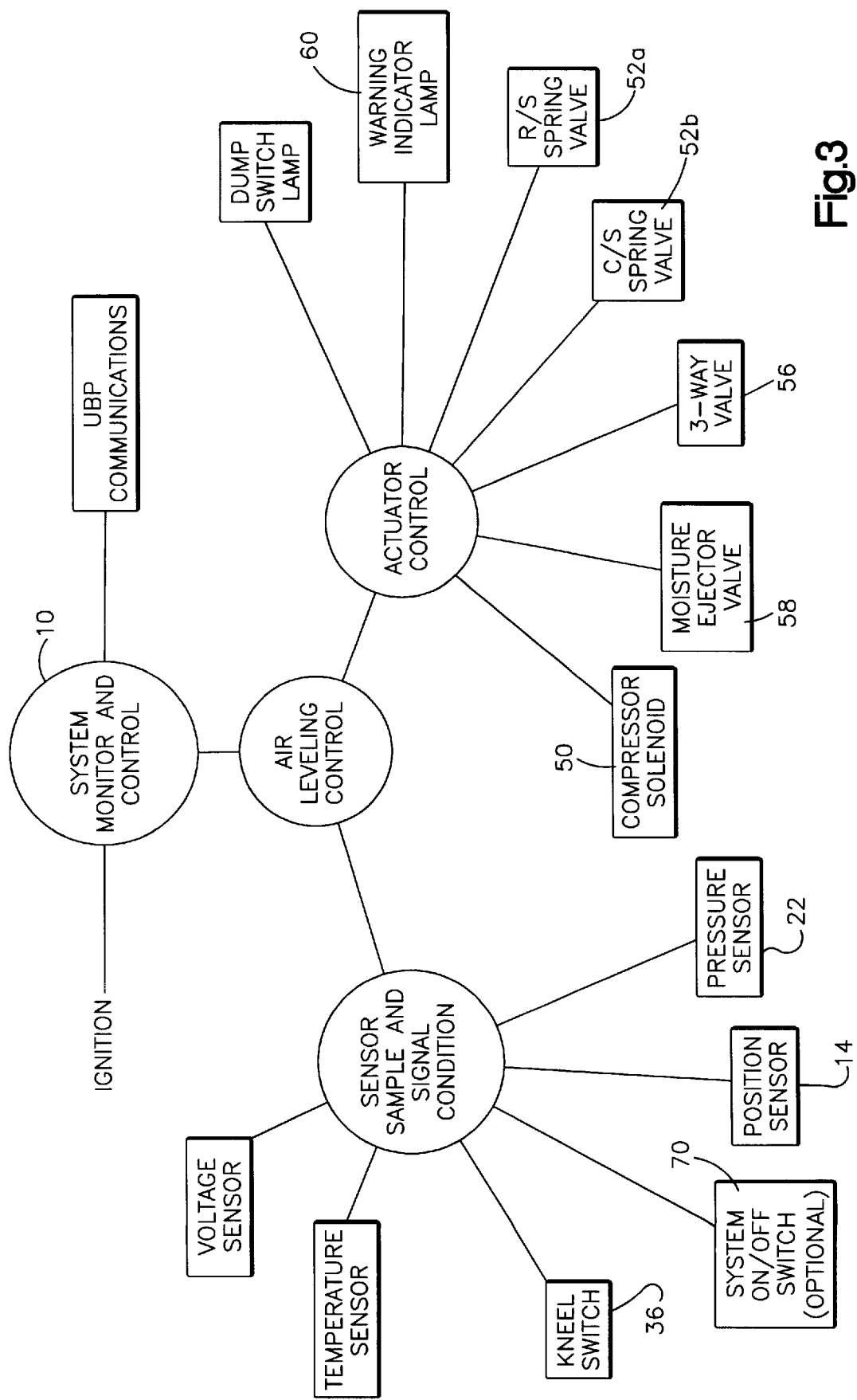

The disclosed embodiment of the invention is a packaged in a self contained module or housing 35 attached to elements of a lateral control mechanism at the rear of the vehicle, near or at the vehicle differential 13. The controller 12 monitors inputs from a vehicle ignition, vehicle ground and the position sensor 14 and provides output signals for controlling a compressor drive, a three way valve and inflate valves. The controller includes an EEPROM that allows certain constants used during operation to be stored in memory of the programmable controller. One such constant is a customer height selection that can be adjusted and is set at the factory and stored in the EEPROM. FIGS. 2 and 3 provide a functional block diagram of the functions performed by an exemplary embodiment of the invention.

Controller Inputs

The vehicle ignition is used to power up the controller 12 and in accordance with the exemplary embodiment is a 12 volt positive switch signal. Ground to the controller 12 is provided from the negative vehicle battery terminal. The pressure sensor 22 provides a signal input to the controller 12. The pressure sensor has a working range of 0–150 pounds per square inch and will provide the controller 12 with an analog voltage signal from 0–5 volts that is proportional to pressure. The height position sensor 14 has an active range of 77 millimeters. The height position sensor 14 also provides an analog voltage signal in the range from 1–4 volts. A kneel switch 36 provides an input to the controller 12 that informs the controller that the user wants the vehicle to switch between a trim mode and a kneel mode. A kneel position is defined as the vehicle position when air bladders of the spring 20 are vented to atmosphere to lower the vehicle body including the frame to a minimum position. The kneel switch also is used to enter a kill or off mode described below.

Figure 4:
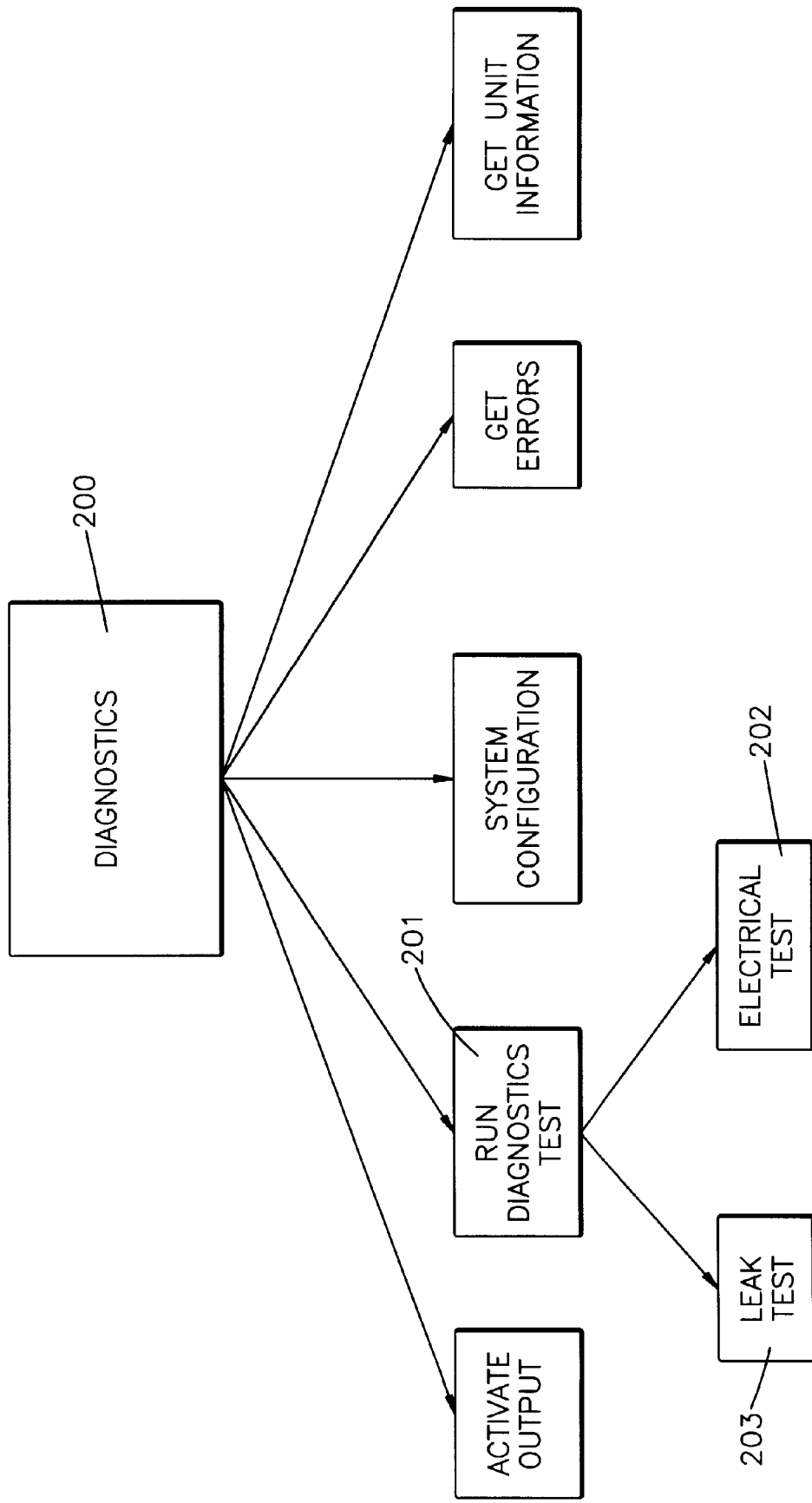
Figure 5:
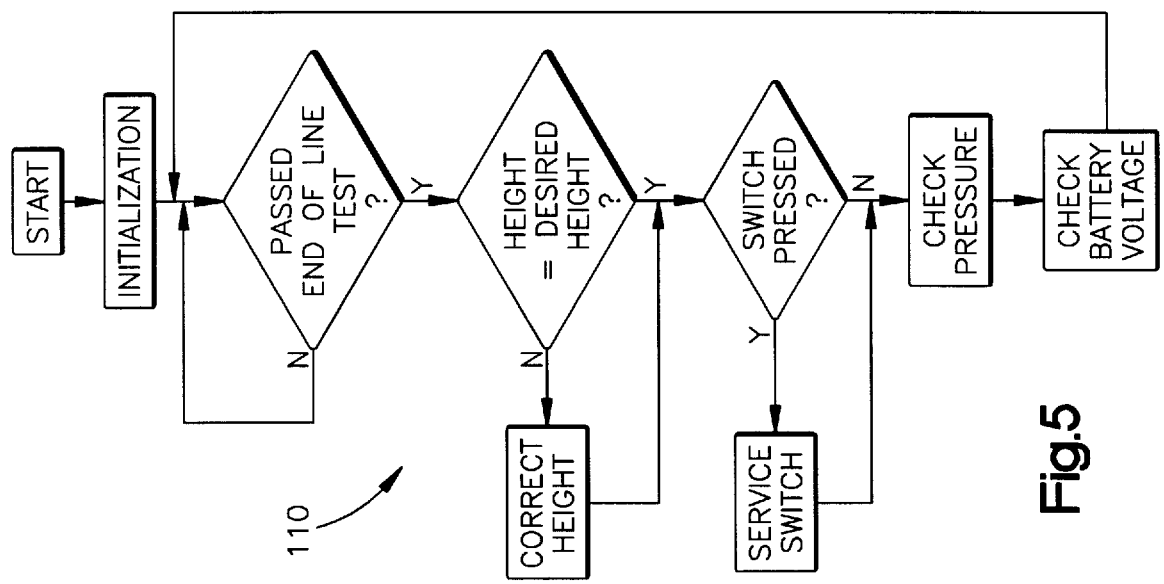
FIGS. 4A and 5–8 are flow diagrams for use in implementing control functions of the invention.

The controller 12 incorporates an asynchronous serial communications interface through which it receives setup and diagnostic commands as well as vehicle speed information. During the manufacturing process, the vehicle suspension is blocked to a reference height and a programming tool is connected to the controller via the wiring harness connector. The programming tool issues commands over the communications interface to record the reference height, from which the trim height is derived later in the manufacturing process. Diagnostic functions 200 of FIG. 4 are initiated by a command from a communications interface 54. This feature allows an external controller to query the controller 12 about past performance and gather information as well as control operation of the controller. One command that is activated by the external controller is a command to run a diagnostics test 201 which includes an electrical test 202 and a leak test 203. The electrical test 202 performs a series of memory tests on the controller and also activates certain outputs from the controller in a controlled manner.

Controller Outputs

The controller 12 provides a battery output B+ through a solid state switch for energizing a compressor relay by means of a compressor solenoid 50. The controller provides a battery output B+ through additional outputs to energize curb side and road side inflate valves 52a, 52b. The controller 12 also supplies a B+ switched output through a solid state switch to energize a three way valve 56 which connects the air reservoir 24 to the inflate valves when energized. When de-energized, the three way valve 56 opens and will allow the air in the air bag springs to be vented to atmosphere if the inflate valves 52a, 52b are energized. The controller 12 also supplies a switched B+ signal through a solid state switch to energize a moisture ejector valve 58 that allows the purging of moisture from the air reservoir 24. The controller 12 also supplies a ground signal through a solid state switch to energize a lamp 60 to indicate when the system is in kneel mode, kill mode, or that a fault condition has been sensed.

Operation

The flow charts of FIGS. 4, 4A and 5–8 depict operation of the controller 12 both during normal operation 100 and during a diagnostic mode 200 of operation initiated by means of a control signal via the communications interface 54.

Rear leveling is accomplished by sensing the position of the vehicle body with respect to the rear axle 11. The sensed position of the vehicle body is then used to determine if the vehicle is in trim, is too low, or is too high. If the vehicle is too low, the controller 12 will activate the two height adjust valves 52a, 52b and the 3-way valve 56, to inflate the air system and hence increase the vehicle height. If the vehicle is too high, the control will enable the valves 52a, 52b to deflate the air system and hence decrease the vehicle height.

Once the vehicle leveling is achieved (trim position), the system 10 continues to monitor the vehicle position and make height adjustments as needed. A routine 100 (FIG. 6) periodically monitors the parameters used by the controller 12 in performing its functions. This routine is performed periodically regardless of the mode the controller is in.

In one embodiment of the invention there is an operator switch, the kneel switch 36, which has priority over any function or mode that the controller is performing. Alternate embodiments contemplate other user actuated inputs wherein the controller 12 includes circuitry and/or software for interfacing with manual control inputs for particular operational functions such as increasing and/or decreasing fluid spring stiffness characteristics of the vehicle suspension. These inputs could also respond to manual control inputs for particular operational functions such as increasing and/or decreasing fluid damping characteristics of the vehicle suspension.

The controller has eight modes of operation, initialization mode, trim mode, inflate mode, exhaust mode, kneel mode, kill mode, compressor mode, and diagnostics mode. These different modes are described in turn.

1. Initialization mode 110 (FIG. 5)—Upon receipt of a vehicle ignition signal when the ignition switch 70 is closed, the system 10 will initialize and allow normal operation after a 3 second delay. The delay will prevent quick cycling of the air compressor 34, valves 52a, 52b, etc., if the ignition is cycled at a rapid rate. During this time the system 10 will perform a RAM test and a checksum test of the ROM to validate the controller 12. If these tests fail, the system 10 does not operate. The first time the system 10 is powered up, the control will default to kill mode (described below). Otherwise, the system will enter the mode it was in when the ignition was last switched off.

2. Trim mode 112 (FIG. 7)—The system 10 provides a finite zone between vehicle high and vehicle low conditions wherein the vehicle is considered level. During such a condition, the controller 12 is in trim mode and no output drives are active, with the exception of the compressor output to the compressor solenoid 50. If pressure in the air reservoir falls below a preset level as sensed by the pressure transducer 22, the compressor 34 will turn on until it achieves adequate pressure in the reservoir. In the event that the system 10 is turned off via the kneel switch 36 during a return to trim from kneel operation, the trim function will continue until the trim position is achieved. Once trim is achieved, the system will go to kill mode under this condition.

3. Inflate mode—If the control detects a vehicle low condition for 10 seconds, the controller 12 enters inflate mode. In this mode, the controller 12 provides the appropriate outputs to activate the two inflate valves 52a, 52b, and the three way valve 56. This will allow air to flow into the suspension system and raise the vehicle. The controller 12 remains in inflate mode until trim mode is achieved as sensed by the linear position sensor 14. The controller 12 will terminate inflate mode if the compression duration times out, the ignition 70 is turned off, or the kneel switch 36 is activated. If the ignition 70 is turned on, and the controller 12 determines that the compressor 34 and/or inflate valves 52a, 52b and 56 should be on, the controller 12 will wait 2.5 seconds before enabling the required outputs.

4. Exhaust mode—If the controller 12 detects a vehicle high condition for 10 seconds, the controller 12 enters exhaust mode. In this mode the controller 12 provides the appropriate outputs to energize the inflate valves 52a, 52b which allows the 3-way valve 56 to vent air to the atmosphere from the air suspension system and lowers the vehicle. The control remains in exhaust mode until the trim position is achieved as sensed by inputs from the linear position sensor 14. The controller also exits the exhaust mode if an exhaust duration times out, the ignition 70 is turned off, or the kneel switch 36 is activated.

5. Kneel mode—If the controller 12 detects that the kneel switch 36 has been activated, the controller 12 enters kneel mode. In this mode the controller 12 provides the appropriate outputs to energize the inflate valves 52a, 52b. This releases air from the air suspension system through normally-open valve 56 and lowers the vehicle. The 3-way valve remains open throughout the duration of kneel mode. The IP indicator lamp 60 and the switch indicator located in the switch 36 will remain on during kneel mode. When in kneel mode, the controller 12 will activate the compressor 34 until the air reservoir has achieved maximum air pressure. The controller 12 remains in kneel mode until the kneel switch is activated. If the ignition is turned off, the vehicle will remain in kneel mode.

6. Kill mode—The system 10 can be turned on and off by double tapping the kneel switch (much like a computer mouse). Each key press must be greater than or equal to 100 ms, but less than 500 ms, with both key presses occurring within one second. If the double key press conditions are not met within the one second time frame, the sequence will be cleared and no mode change will occur. When in kill mode, the IP lamp 60 will slowly blink (one second on, 1 second off).

7. Compressor mode 114 (FIG. 8)—When the pressure in the air reservoir reaches a 90 psi low-pressure limit, the controller 12 will turn on the compressor 34. The compressor will remain on until a 125 psi maximum pressure is reached as sensed by the pressure transducer 22, the system 10 goes to kill mode or the ignition switch 70 is turned off. If the pressure does not reach the maximum pressure a preset selected time in seconds, the system will turn off the compressor and display a system fault on the IP indicator lamp 60. If the system is in the kneel mode and the pressure in the reservoir is below the maximum pressure minus 5 psi, the system 10 will turn the compressor 34 on.

8. Diagnostics mode 200 (FIGS. 4, 4A)—Diagnostics mode is entered when a "Request Diagnostics State" entry command is received over the communications interface 54. The controller remains in diagnostics mode until either a "Request Operation State" entry command is received, or no command of any sort is received for 5 seconds.

Figure 4A:
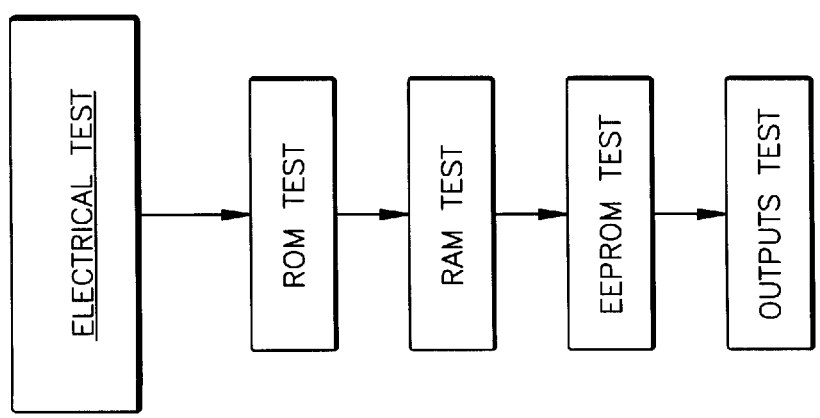
Figure 6:
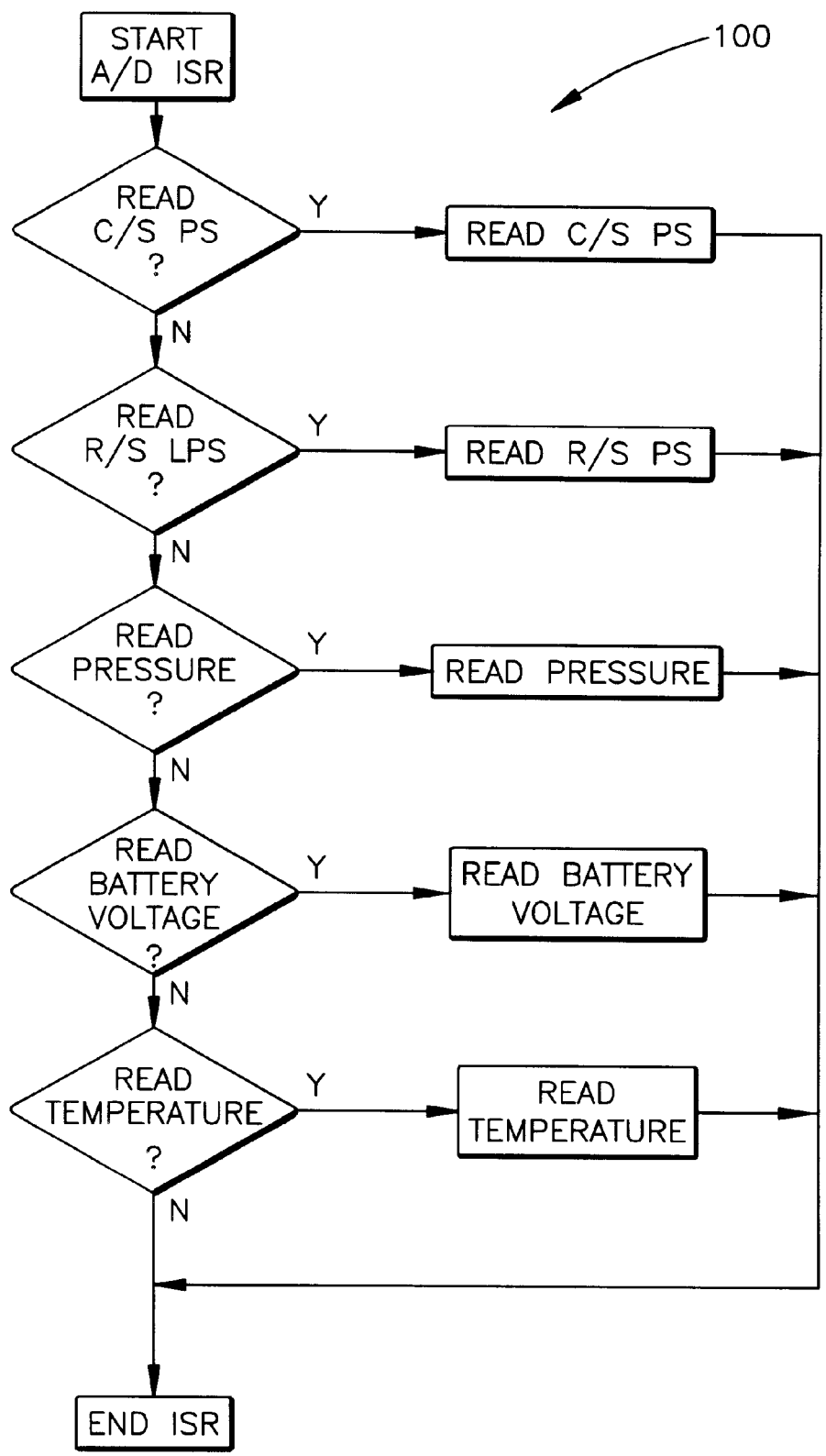
Figure 7:
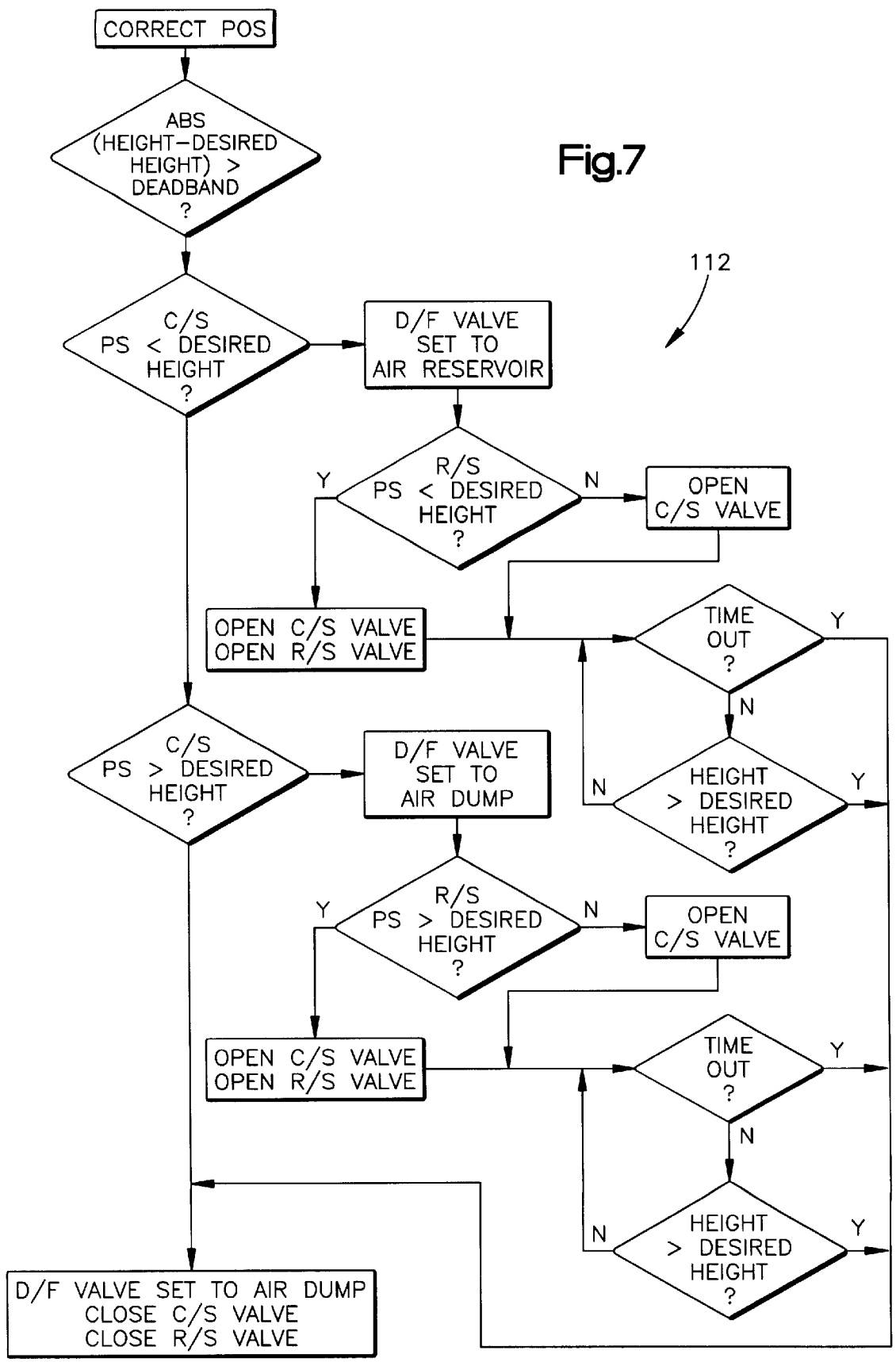
Figure 8:
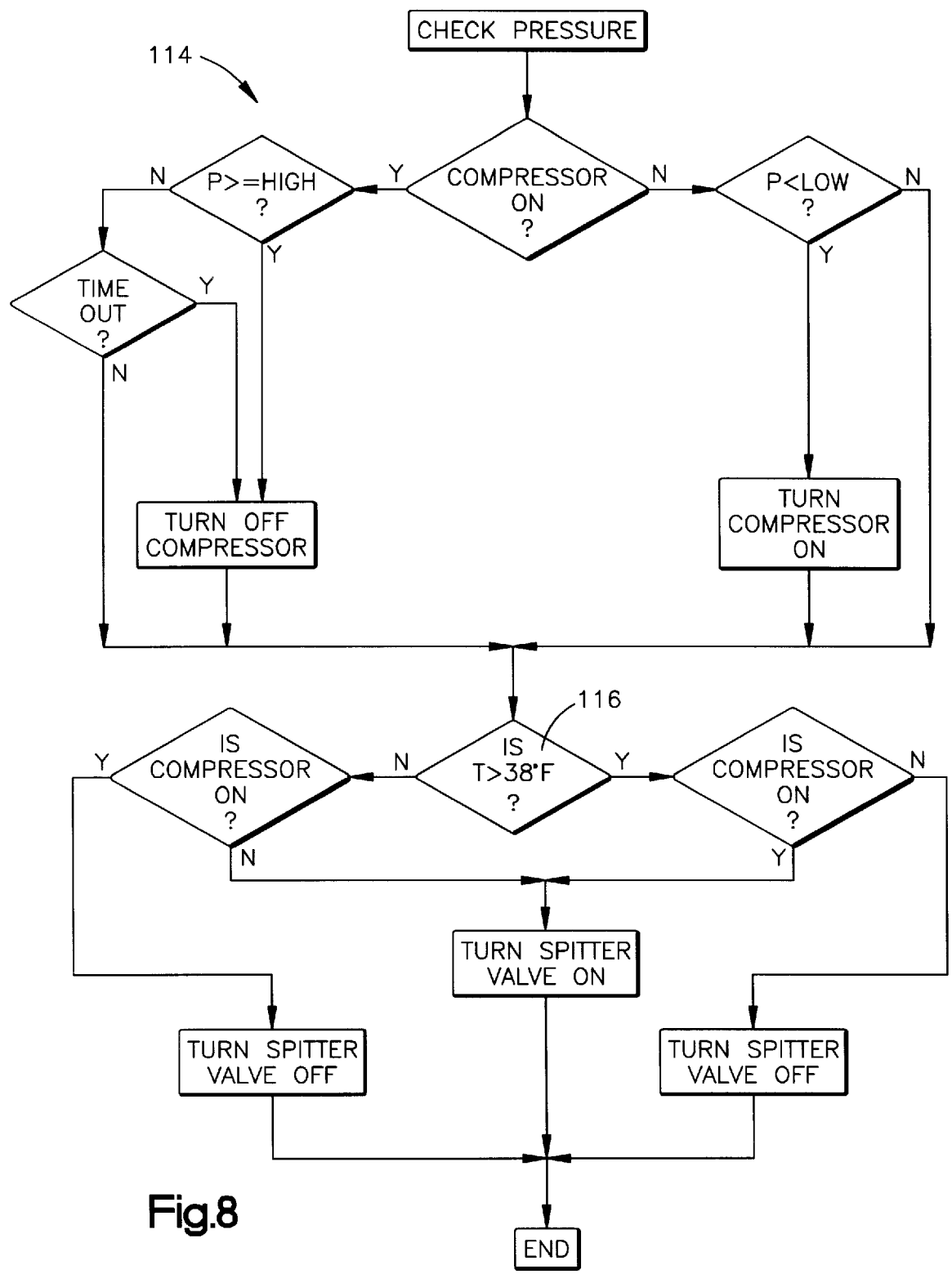

In diagnostics mode, commands may be issued to the controller through the communications interface to perform the diagnostics self-tests described in FIGS. 4A and 4B and to request the results of those tests. Each of the outputs can be individually exercised and the inputs queried. Commands can be issued to raise or lower the vehicle and to record the reference height. Commands can also be issued to determine the operating state and version numbers of the controller.

Optional serial communications by such means as UBP (UART-Based Protocol), CAN (Controller Area Network), J-1850 or the like is used for diagnostics and/or function control. This enables the vehicle suspension control system to interface with other vehicle systems and/or aids in diagnostic performance evaluation.

As an option the IP indicator lamp could display a blinking pattern according to the type of error that is sensed. The diagnostic mode includes the following tests:

1. If the warning light does not come on the system fails.
2. The compressor is turned on for five seconds. If the pressure does not increase, the system 10 fails and the warning lamp will display 1 blink per cycle.
3. With the compressor off, if the sensed pressure changes, the test fails and the warning lamp is activated with two blinks per cycle.
4. An inflate operation is performed. The controller 12 will inflate the air suspension bladders for five seconds. If movement in the height sensor is not detected the test fails and the warning lamp will display 3 blinks per cycle.
5. With the valves off, if the height sensor changes the test fails and the warning lamp will display four blinks per cycle.
6. An exhaust operation is performed. The control will exhaust the air suspension bladders for 1 second. If the height sensor does not detect movement, the test fails and the warning lamp will display 5 blinks per cycle.
7. With the valves off, if the height sensor changes the test fails and the warning lamp will display 6 blinks per cycle.
8. If there is an electrical fault with the spitter valve drive or the compressor drive, the warning lamp will display 7 blinks per cycle.
9. If there is an electrical fault with the three way valve drive or the inflate valve drive, the warning lamp will display 8 blinks per cycle.

The controller remains in diagnostics mode until either a "Request Operation State" entry command is received or no command of any sort is received for 5 seconds.

A moisture ejector valve 58 is present on the system to drain any accumulated moisture from the air reservoir. As depicted in the flow chart of FIG. 8, a test 116 is performed the temperature as detected by means of a temperature sensor 118 is compared to a set point. When the temperature is above 38 degrees Fahrenheit, the moisture ejector valve shall be energized whenever the compressor is active. When the temperature is below 38 degrees Fahrenheit, the moisture ejector valve shall be energized whenever the compressor is inactive.

If the suspension system does not achieve the required position after 360 seconds when going from kneel to trim and 90 seconds from trim to kneel, the IP lamp will be activated at a 2 second on, 2 second off blink rate.

An output fault detection reset occurs whenever the ignition is cycled off.

Each valid position sensor input reading is averaged into the previous readings to create a time weighted average calculation.

Any valid vehicle low to trim or vehicle high to trim transition is delayed 640 msec. This road data averaging technique makes the system less sensitive to transients due to small bumps or irregular road surface.

Vehicle suspension control system configurations range widely from a single position sensor with a single actuator to multiple position sensors with multiple actuators and variations in between. Examples of various vehicle suspension control systems include single position sensor with single actuator for basic height control; single position sensor with multiple actuator to provide increased force/and or for failsafe redundancy; multiple redundant position sensors to provide safer operation; position sensing and actuation at each of left and right sides of one solid axle or one pair of independent axles for load management and/or dynamic tilt control; position sensing and actuation of both front suspension units and position sensing and actuation of at least one rear center or multiple separated suspension units for complete vehicle load management and complete dynamic level control.

One control unit can interface with multiple position sensors and with additional vehicle sensors to implement independent and/or dependent control functions for the representative positions measured. Multiple control units associated with independent position sensors of a multi-axis control system can interface in master/slave mode to share control circuitry, implement functional control hierarchy, share communication, and lower total system cost. Cooperation of multiple position sensing and actuations into a complete system enables adaptive reaction response to vehicle dynamics, road conditions, and drive inputs to provide better handling response and safer performance as described in the incorporated by reference patent.

Figure 10:
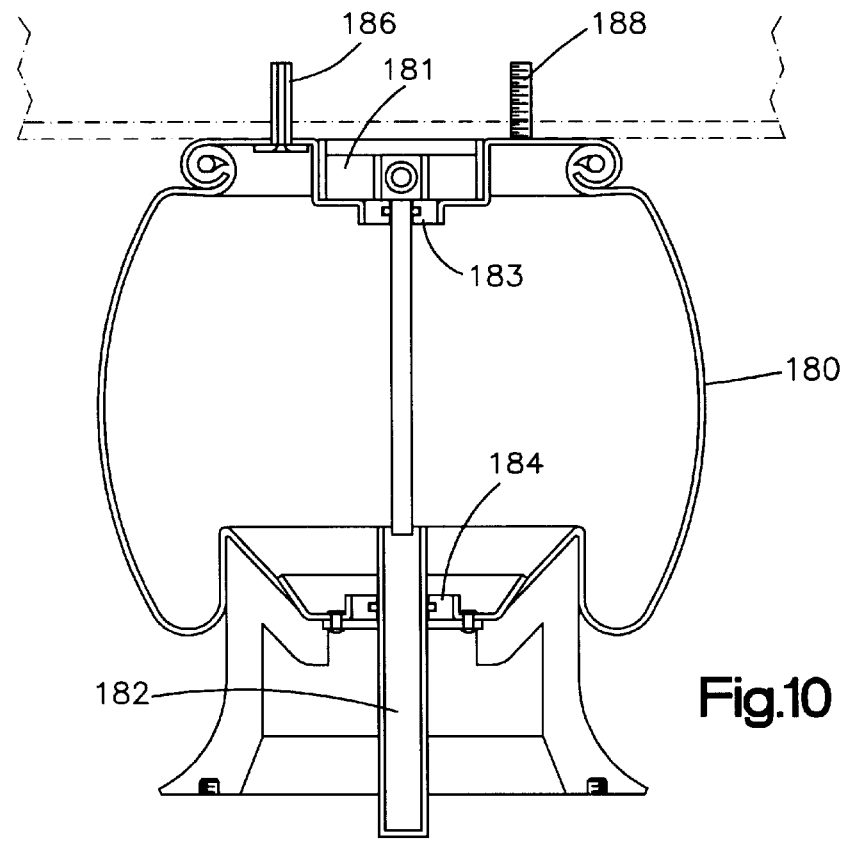
FIG. 10 is a schematic depiction of a pressured gas spring with an internal height adjustment sensor for use in accordance with an alternate embodiment of the invention.
Figure 11:
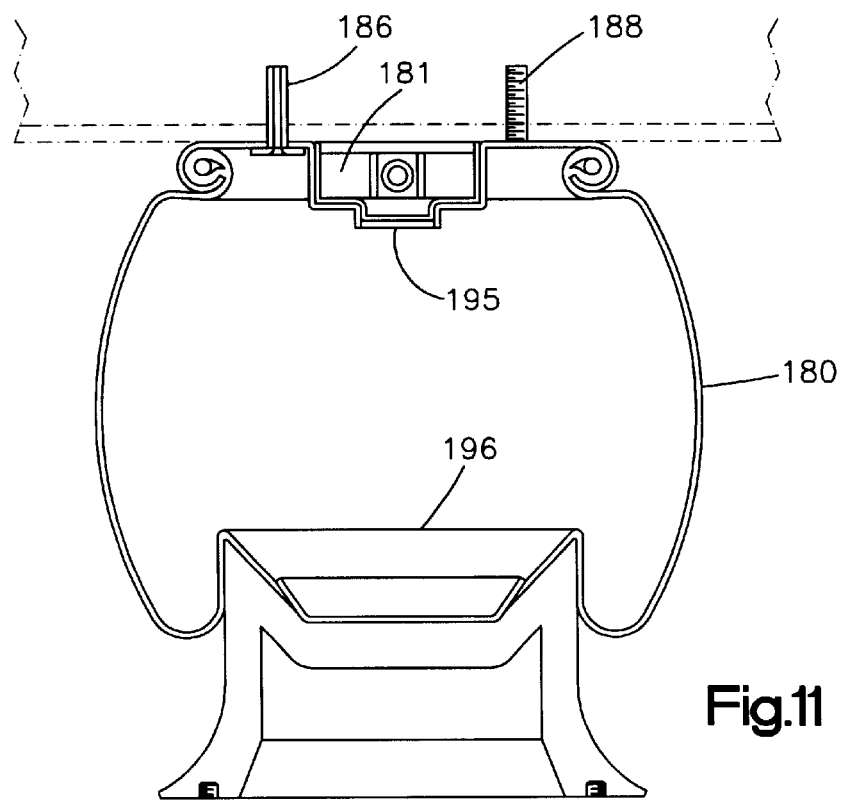
FIG. 11 is a schematic depiction of a pressured gas spring with an ultrasonic transducer for use in accordance with an additional embodiment of the invention.

FIGS. 10 and 11 portray components of two alternate fluid-pressurized height adjusting systems. Height adjustment is principally used for leveling, but it can also maintain a specified out of level condition. FIG. 10 depicts a cylindrically shaped flexible bag type air spring 180 that includes curved side walls that are attached to a mounting plate at the top and to a bumper at the bottom. The combination of the bag, plate and bumper define an interior region which can be pressurized to raise and lower the vehicle frame supported by the air spring. One such air spring is commercially available from Firestone having a place of business at 126050 Hamilton Crossing Blvd., Carmel, Ind., 46032-5400. The embodiment of the invention depicted in FIGS. 10 and 11 could alternately use another type of pneumatic actuated device. A linear position sensor 14 of FIG. 10 includes a housing 181 for the electronics portion of the sensor and a spoiler 182 that surrounds an elongated field creating member of the sensor. Seals 183, 184 prevent fluid from within the air spring 180 from leaking around the sensor components 181, 182. A port extends through a combined mounting stud and air fitting 186 which permits inflow or outflow of the pressure adjusting fluid (typically air) into and out of the spring 180. This stud and another stud depicted in FIG. 10 are used to attach a top plate 188 of the air spring to the vehicle suspension.

Figure 12:
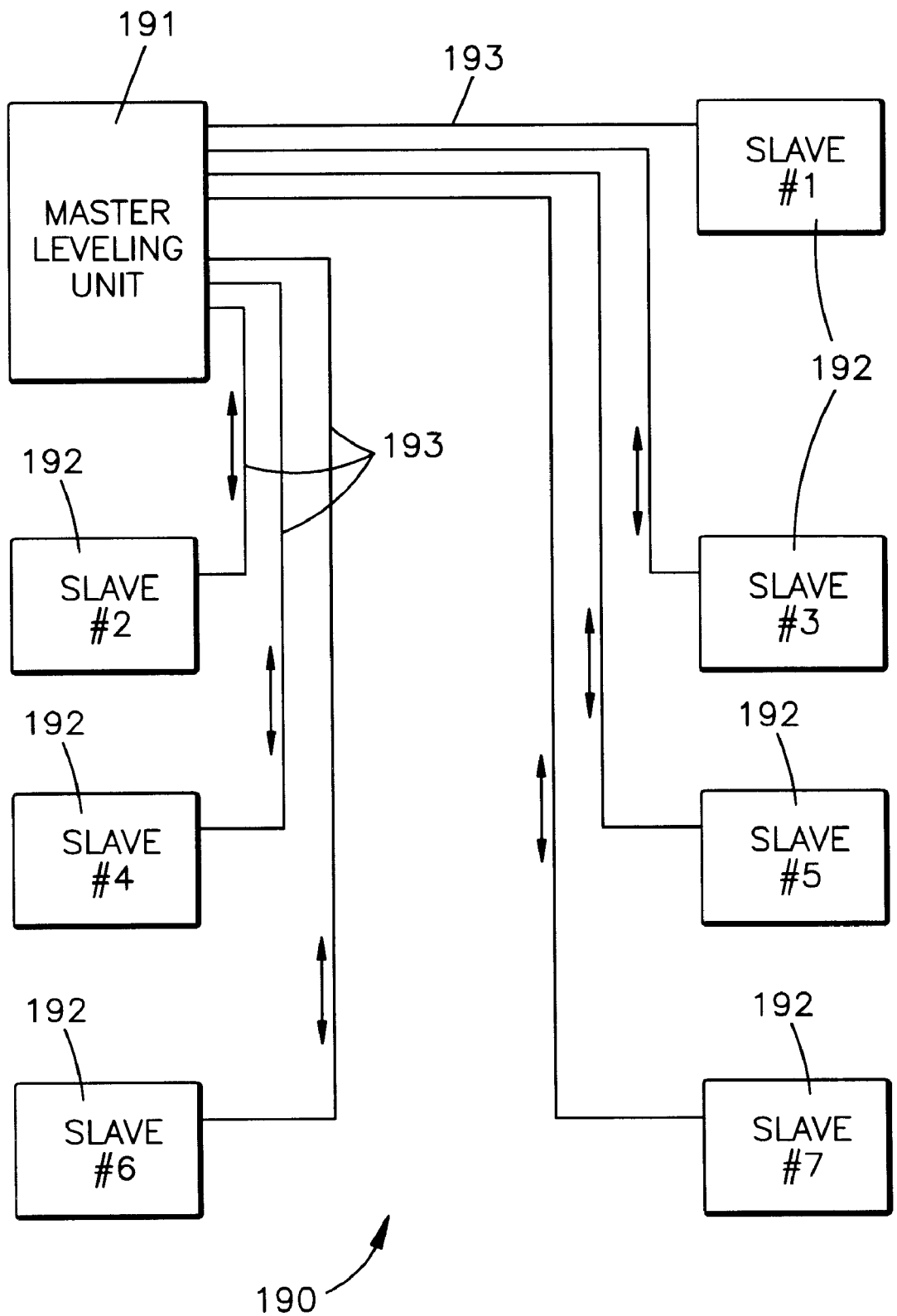
FIG. 12 is a schematic depiction of a control system that utilizes multiple slave sensors that are coupled to a master controller.

FIG. 12 depicts a system 190 containing more than one height adjusting device, one of the height adjusting devices contains a master control 191 and the remaining height adjusting devices are slave units 192 that only sense height. The master is connected by communications links 193 to each of the slave units and is capable of interrogating the slave to determine what adjustment to the fluid pressure is required to keep the suspended vehicle frame at the proper height and to direct independent alteration of pressure to each slave or itself. FIG. 11 portrays an ultrasonic system for measuring height within a bag type air spring. The ultrasonic module 195 targets an opposite side 196 of the air spring to determine a distance across the extent of the air spring and hence separation between vehicle components.

Linear Position Sensor

Figure 13:
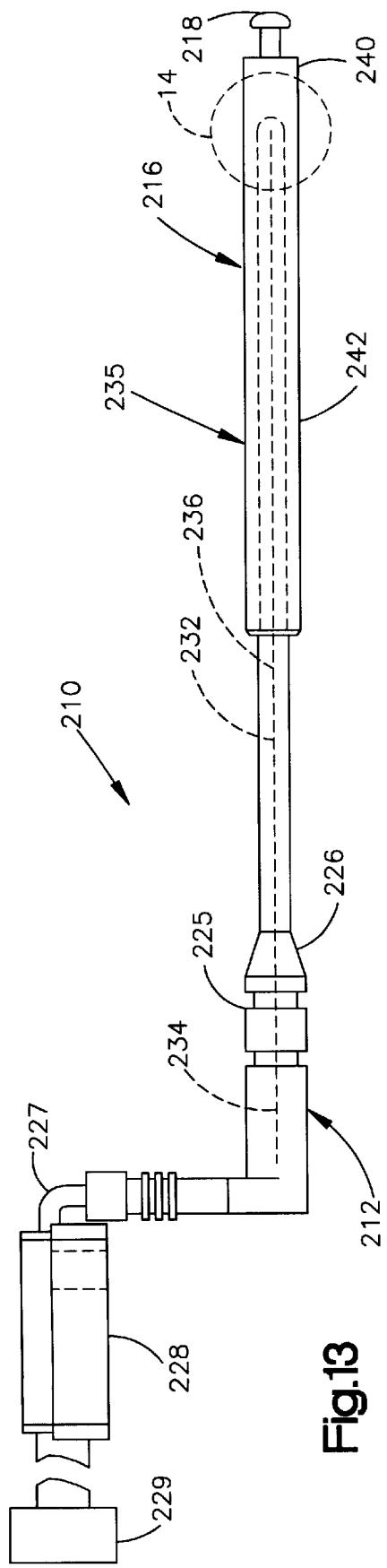
FIG. 13 is a sectional side view of a non-contact linear position sensor according to one embodiment of the invention.
Figure 27:
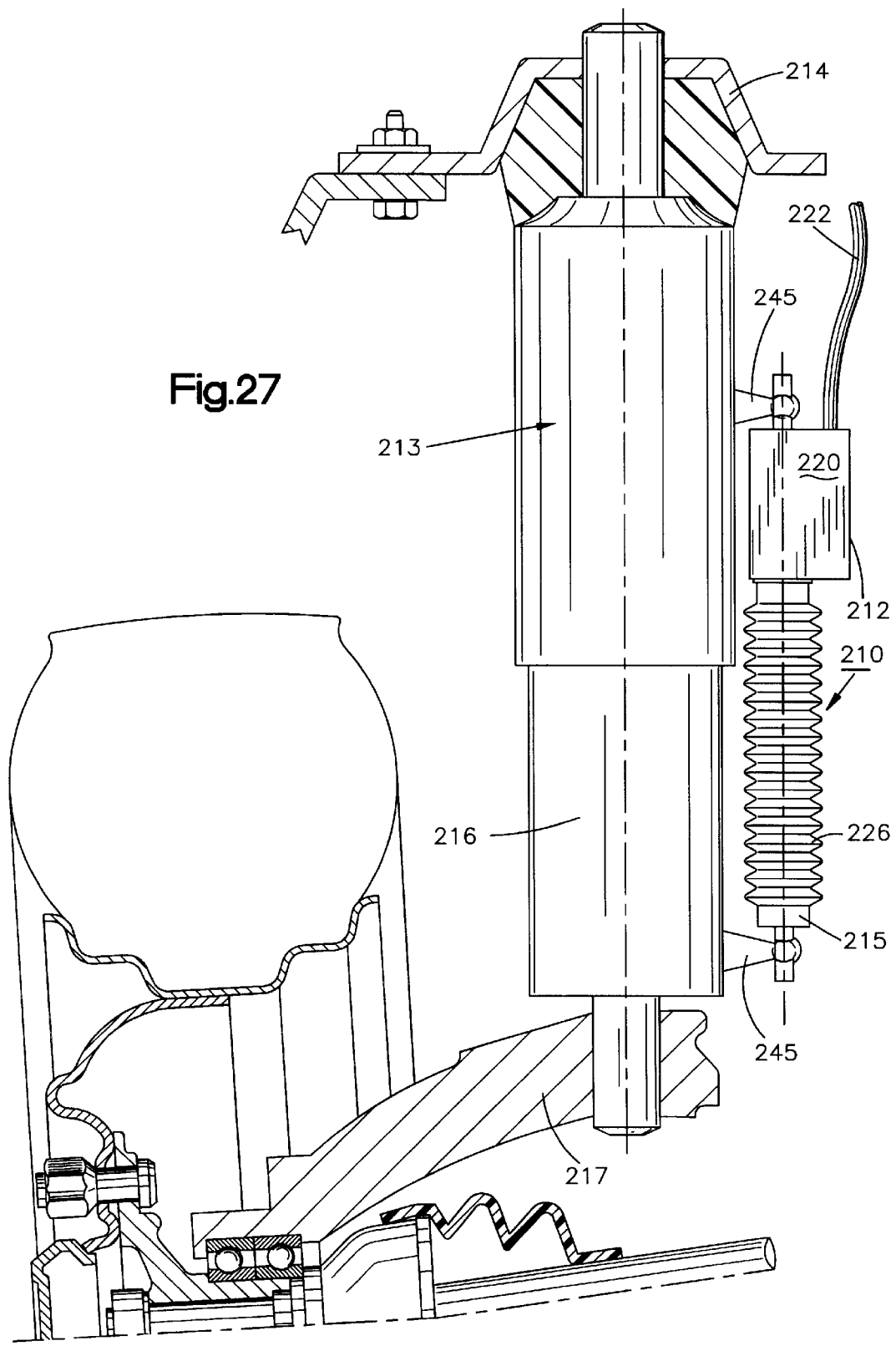
FIG. 27 is a schematic depiction of a vehicle suspension.

Referring now to FIGS. 13, 25, and 27 and the illustrative embodiments depicted therein, a non-contact position sensor 210 includes a base portion 216 attached to one portion of a vehicle, such as the portion of a shock absorber 213 attached to the vehicle chassis 214, and a tracking portion 216 which is attached to a portion of the vehicle whose position it is desired to sense, such as the portion 16 of the shock absorber attached to a wheel support assembly 217 (FIG. 27). The base and tracking portions 212, 216 are relatively longitudinally movable with respect to each other and are external to the shock absorber 213.

The position sensor 210 further includes a housing 220 that supports circuitry 228 (FIG. 17) for generating position indicating signals and transmitting those signals via a cable 222 to a vehicle ride control computer. In a preferred design an electrical connector 629 (FIG. 14) attached to the cable 222 is adapted to engage a mating connector (not shown) for connection to a ride control controller 12 and provides input and output interconnection for the position sensor 210.

A flexible cylindrical bellows 226 is coupled at one end to the base portion and at an opposite end to the tracking portion of the sensor 210 and defines an internal chamber 226a. A winding assembly 232 extends from the base portion 212 into a region surrounded by the tracking portion. The winding assembly 232 includes a proximal end portion 234 fixed to the sensor base portion 212 and a distal sensing portion 236 positioned within the tracking portion 216.

The tracking portion 216 includes a support 240 for a transformer coupling member that includes an elongated tubular conductor 242. The tubular conductor 242 has an inner diameter selected to freely slide over an outer diameter of the winding assembly 232. The support 240 includes a fitting 242a for attachment of the tracking portion 215 of the sensor to a mounting stud 245 of the shock absorber. A similarly constructed fitting 242b at the base portion 212 of the sensor 210 allows the sensor 210 to be attached to a second mounting stud 245 attached to the shock absorber.

The sensing element or winding assembly 232, includes a primary winding 244 and a secondary winding 246 that are mutually encapsulated within encapsulating material 248 (FIGS. 14 and 15). The primary and secondary windings 244, 246 are coextensive or side-by-side, for substantially their entire length which spans the winding assembly 232 and are generally mutually parallel and spaced apart. The primary winding 244 includes an elongated cylindrical core 250 and a coil 252 defined by a single magnet wire spirally wound around the core 250 over substantially the entire length of the core. The secondary winding 246 includes an elongated cylindrical core 254 having a coil 256 defined by a single magnetic wire radially wound around core 254 over substantially its entire length. In one preferred embodiment, the cores 250, 254 are 0.05 inch diameter ferromagnetic rods such as alloy 251 from Carpenter Technology Corp. and are 7.2 inches in length. The coils 252, 256 include a double layer of 239 AWG wire, compactly wound on the associated insulated core which produces an inductance of 3 to 4 millihenries for each coil. Primary and secondary winding 244, 246 are mutually encapsulated by a material 248 which is encased within a plastic sleeve 249, and in the illustrated embodiment, is a soft compound such as DOW Corning 4442.

The proximal end 234 of the winding assembly 232 for includes a plastic carrier that carries metal terminals for routing energization signals to the primary winding 244 and output signals from the secondary winding 246. The carrier is constructed from plastic (preferably 30% glass reinforced polyester) and is molded to form right and left carrier halves. Each half defines an opening into which the cylindrical cores 250, 254 are pressfit.

The wire coils 252, 256 are then wound around the cores 250, 254 and attached to their respective terminals. The two halves of the carrier are then attached together and the cores 250, 254 are suspended in the suspension material 248. To suspend the windings 244, 246 the cylindrical sheath is filled with the suspension material by pouring the material into an inner cavity of the sheath. An end cap or plug is pressed into a distal end of the sheath. The completed winding assembly 232 is then pushed into the base portion 212 of the sensor until the carrier seats within a cavity in the base portion 212. A plastic cover that includes the fitting is then connected to the base portion 212 to fix the winding assembly 232 in place. The carrier is depicted in U.S. Pat. No. 5,210,490 to Munch et al. which is incorporated herein by reference.

The bellows 226 engages similarly configured circular slots or grooves 257, 259 defined by the base and tracking portions 212, 216 respectively and inhibits dirt and the like from entering the sliding interface between the support 240 and the base portion 212. During installation the tracking portion 215 is attached to the shock absorber via the fitting and stud connection. The bellows 226 is attached to the tracking portion 215 and the base portion so the winding assembly 232 fits within the conductor 242. The base portion 212 is then attached to the stud 245 via the fitting and the bellows attached to the base portion by pushing the bellows over the base portion 212 until ridges of the bellows seat in the grooves 257.

When the sensor 210 is installed the tubular portion 242 of the tracking portion 216 surrounds a varying length of the coextensive, spaced, parallel primary and secondary windings 244, 246 and provides a transformer coupling adjustment member for the windings, which are configured as a transformer. In the embodiment illustrated in FIGS. 13–15, the tubular portion 242 is a transformer coupling enhancing member which increases the transformer coupling between the primary and secondary windings as the sensing portion 236 and tubular portion 242 become more telescopingly coextensive, as a result of movement of the vehicle wheel assembly closer to the vehicle frame.

In the illustrated embodiment, the tubular member 242 is a nonferrous metal, such as aluminum, which enhances transformer coupling between the primary and secondary windings through a radially looping current that is developed in the tubular portion as a result of excitation of the primary winding.

Figure 16:
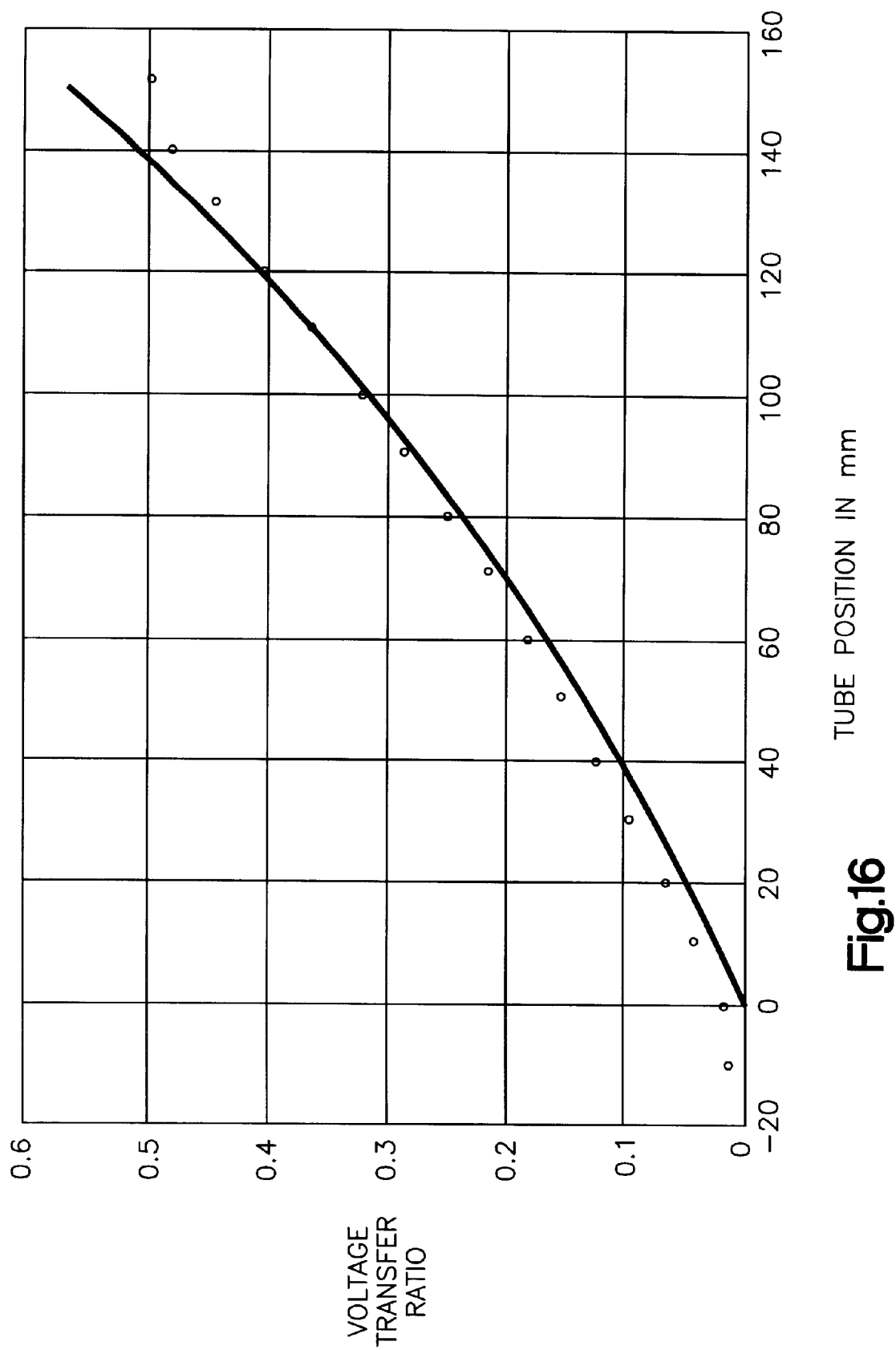
FIG. 16 is a graphic diagram of the voltage transfer ratio as it relates to the relative position of portions of a sensor probe according to the embodiment in FIG. 13.

Sample results obtained from uniformly wound primary and secondary coils are illustrated in FIG. 16. By reference to this figure, it is seen that the signal developed across the secondary winding, which is directly proportional to the voltage transfer ratio, is substantially linearly related to the amount of overlap of the tubular conductor 242 with respect to the sensing or distal portion of the winding assembly 232.

It may be desired to provide a particular characteristic nonlinear voltage transfer ratio for a particular application. The turn density may be arranged in order to "tune" the voltage transfer ratio to the desired characteristic.

In an alternate embodiment of the winding assembly (FIGS. 17 and 18) the suspension material is eliminated and the shell material 248 is extended to secure and provide structural stability to the winding assembly.

The FIG. 14 embodiment has cores 250 and 254 that are 0.05-inch diameter ferromagnetic rods insulated with a 0.002-inch Teflon coating or other insulating material and are 7.2 inches in length. Coils 252 and 256 include a double layer of 41-AWG and 43-AWG wire, respectively, compactly wound on the associated insulated core which produces an inductance of 3 to 4 milihenries for each coil. Primary and secondary windings 244 and 246 are each covered by a protective film such as a Mylar sleeve (not shown), and are mutually encapsulated by an appropriate material 248 which, in the illustrated embodiment is a liquid crystal polymer, such as Celanese Corporation Vectra B-130.

Figure 18:
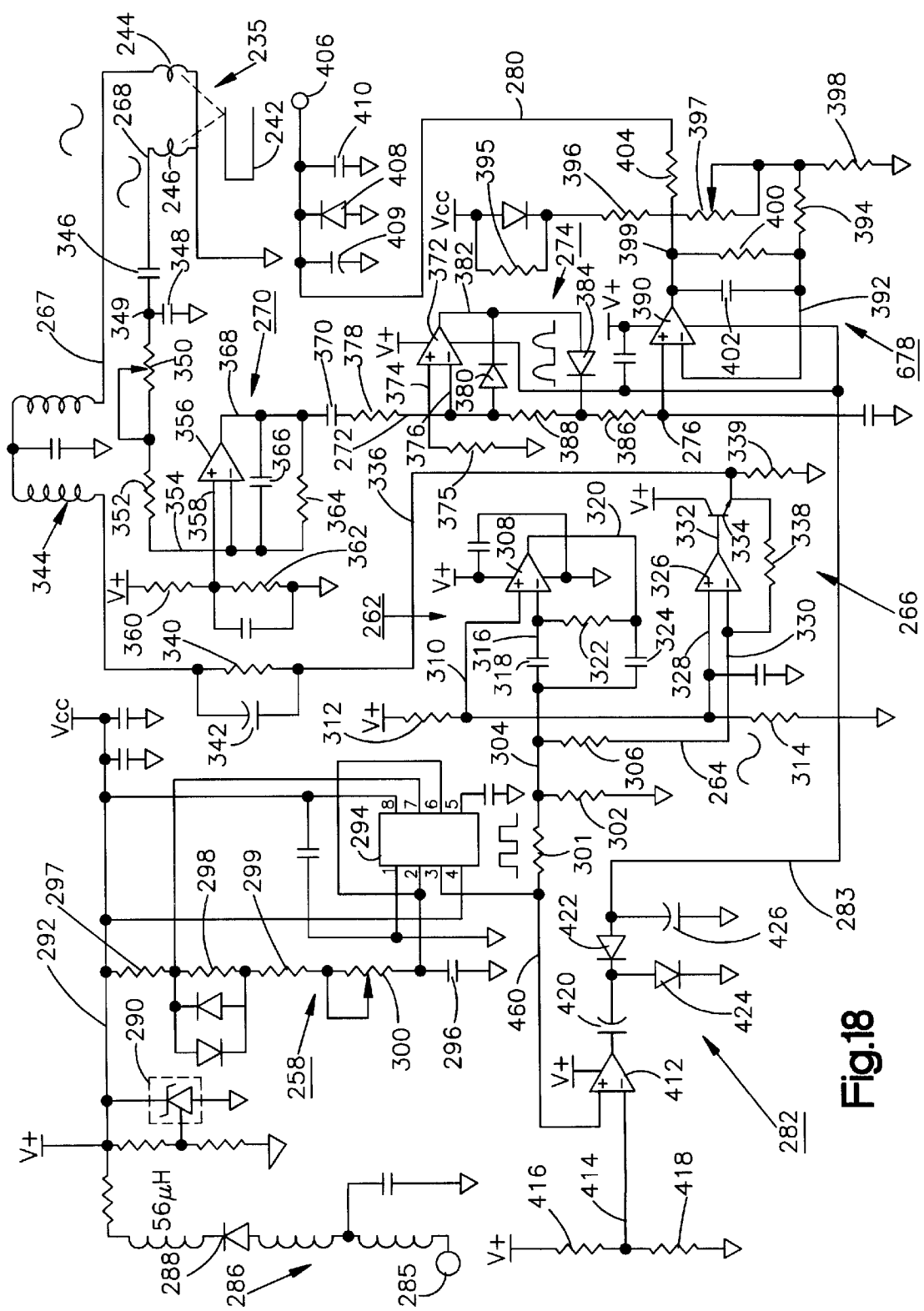
FIG. 18 is an electrical circuit diagram in schematic form of the control circuit in FIG. 17.
Figure 19:
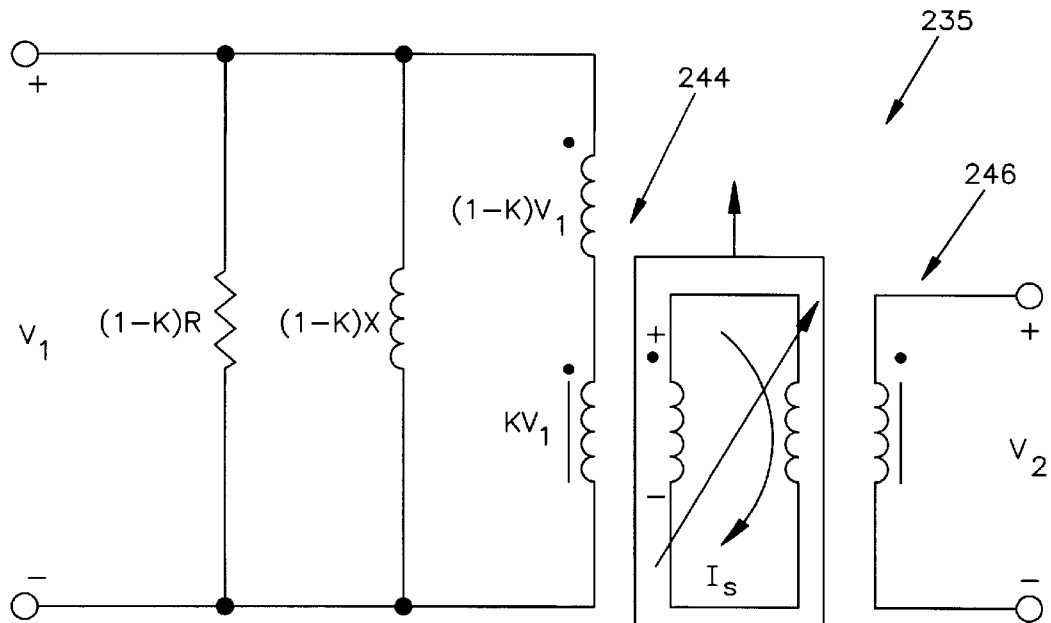
FIG. 19 is a diagram illustrating the equivalent circuit for a sensor probe according to the embodiment in FIGS. 13–18.

With reference to FIG. 18, organization of a control circuit mounted to a printed circuit board 261 carried by the housing 220 will be described. A square wave generator 258 produces a square wave signal on its output line 260. The square wave signal, which operates at 12.8 KHz in the illustrated embodiment, is provided as an input to a sine wave shaper circuit 262 which converts the square wave signal to a low-harmonic distortion sine wave signal having the same frequency which is provided on its output 264. The sine wave signal is amplified by an amplifier and driver circuit 266 and provided at an output 267 to the primary winding 244 of the winding assembly 232. The sine wave signal provided to the primary winding is coupled to the secondary winding in proportion to the relative longitudinal overlap of the winding assembly 232 and the coupling member 242. The signal developed across the secondary winding is provided on an output 268 to a buffer amplifier 270, which provides a high input impedance for and amplifies the relatively small signal developed across the secondary winding. Buffer amplifier 270 additionally includes means for eliminating induced high frequency noise and any DC offset. The output 272 of the buffer amplifier is provided to a precision rectifier 274 which produces a DC analog voltage on its output 276, proportional to the average AC voltage developed across the secondary winding. The DC analog voltage is amplified by a DC amplifier 278 and provided by an output 280 as an input to a ride control computer of the vehicle.

The output 260 of the square wave generator 258 is additionally provided as an input 281 to a negative power source 282 which produces a voltage on its output 283 which is negative with respect to the vehicle chassis ground and is provided as an additional supply voltage to the precision rectifier 274 and the DC amplifier 278. The purpose of supplying these portions of the control module with a negative voltage, which is normally not available in a vehicle electrical system, in addition to the conventional positive supply voltage, is to improve the linearity of the output signal, especially at low signal levels, while allowing the DC offset of the sensor output to be adjusted to a desired level, which may be zero or even a negative voltage. Additionally, by supplying a voltage to the precision rectifier and the DC amplifier that is negative with respect to chassis ground, means are provided for detecting certain internal failures of these circuit portions by monitoring the polarity of the voltage on the output 280. If the polarity of the output becomes more negative than a predetermined level, an indication is provided to the ride control computer that the position sensor is malfunctioning.

Figure 23:
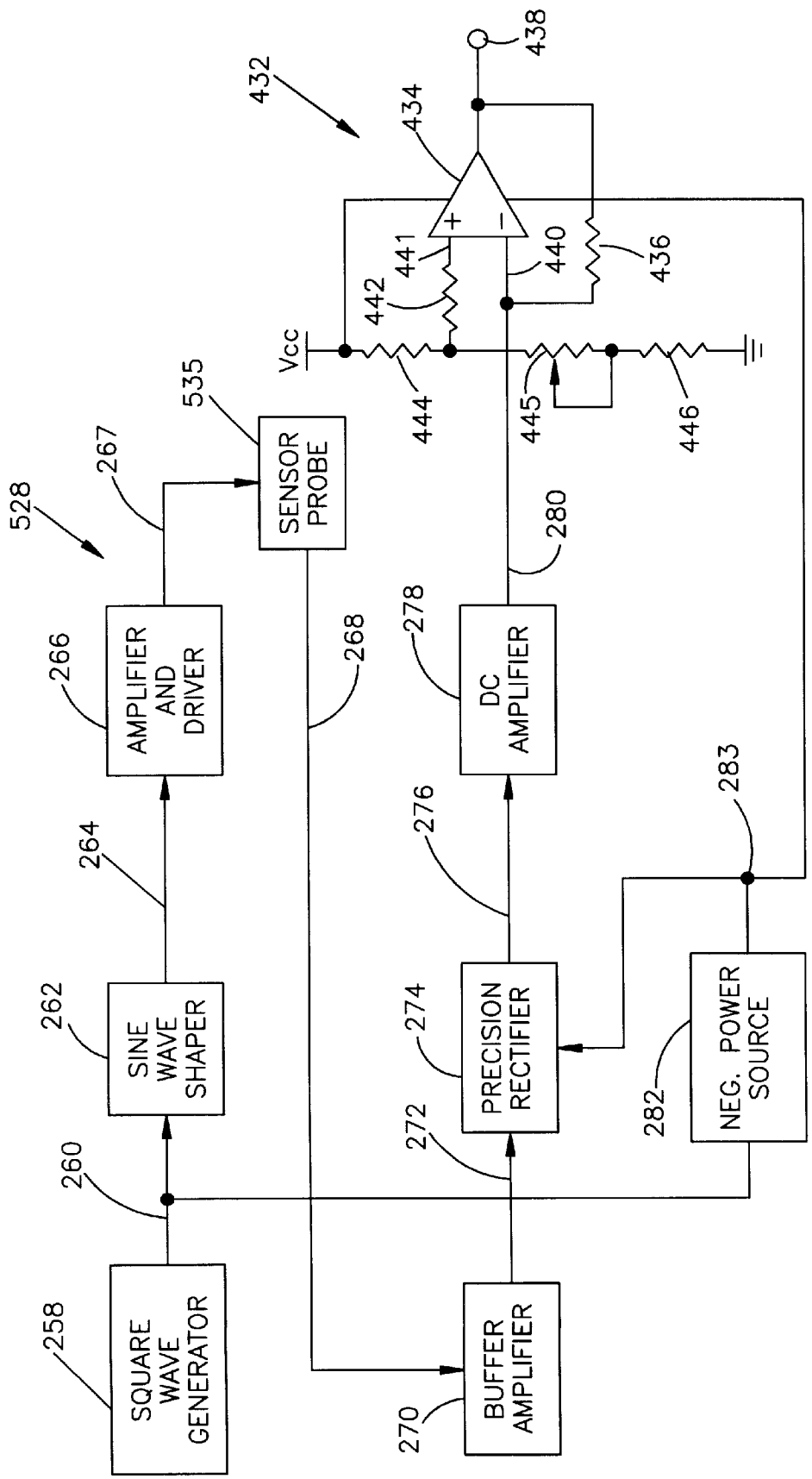
FIG. 23 is an electrical circuit diagram partially in block form and partially in schematic form of the control module of the embodiment illustrated in FIGS. 20–22.

A detailed description of this embodiment of the electrical control system is provided by reference to FIG. 23. The vehicle supply voltage is connected through a connector to an input 285 and is conditioned by an input filter 286 and a reverse polarity protection diode 288. The conditioned supply voltage is regulated to a constant voltage VCC by a voltage regulation means 290, which may be of any such means well-known in the art and is illustrated as a programmable zener diode. The voltage VCC is produced on a bus 292 and is provided as a supply voltage to selected components in the circuit.

A square wave oscillator 258, in the illustrated embodiment, is a type 555 CMOS timer 294 having a frequency established at 12.8 KHz by a capacitor 296 connected between a timing terminal of timer 294 and signal ground and in series connection with resistors 297–300 and VCC bus 292. One of the resistors 300 is adjustable to provide factory adjustment of the frequency of timer 294. As is recognized by one skilled in the art, CMOS timer 294 provides a stable frequency and amplitude source over a wide range of temperature conditions. The output (pin 3) from timer 294 on line 260 is scaled by a pair of precision resistors 301 and 302, connected in a voltage divider arrangement, and provided on line 304. Line 304 is provided as an input 264 to amplifier and driver circuit 266 through a resistor 306. The characteristics of the signal on line 304 are significantly altered by sine wave shaper 262 which is connected between line 304 and ground and serves as an "active load" low-pass filter to shunt the high frequency harmonics of the square wave signal to ground. This allows substantially only the low frequency component of the square wave, which is a sine wave having a frequency equal to the pulse repetition rate of the square wave generator, to pass to the primary winding 244.

Sine wave shaper 262 includes an operational amplifier 308 having a non-inverting input on line 310 held at a constant voltage provided by a voltage divider consisting of resistors 312 and 314 series connected between a positive DC power source V+ and signal ground. Amplifier 308 further includes an inverting input 316 connected with line 304 through a capacitor 318. Amplifier 308 produces an output on a line 320, which is connected with inverting input 316 through a resistor 322 and with line 304 through a capacitor 324. The particular configuration for sine wave shaper 262 causes it to actively shunt higher frequency components of the square wave to ground by the particular feedback arrangement between output line 320 and inverting input 316 including resistor 322 and capacitors 318 and 324, while providing a relatively high impedance to the base frequency of the square wave produced by timer 294 and serving to shape the signal. Accordingly, the resulting signal is a sine wave having a frequency equal to that of the pulse repetition rate of timer 294.

The sine wave signal is provided through a resistor 306 to line 264 as an input to amplifier and driver 266. Amplifier and driver 266 includes an operational amplifier 326 having a non-inverting input 328 provided with a constant voltage level from the voltage divider formed by resistors 312 and 314 and an inverting input 330 connected with input line 264 and provided with the sinusoidal signal previously described. Amplifier 326 includes an output 332 connected directly with the base terminal of a transistor 334 whose collector is connected directly with V+ and whose emitter is connected with a line 336. A feedback resistor 338 connects line 336 with inverting input 330 to establish the combined gain of amplifier 326 and transistor 334 and to cause this combination to operate as a linear amplifier. A resistor 339 between line 336 and signal ground provides a load for amplifier 326 and provides noise suppression of high frequency signals induced from external sources.

Line 336 is connected to a parallel combination of a resistor 340 and a capacitor 342. The purpose of the parallel combination is to reduce the DC component of the signal provided to the primary winding 244 while coupling the AC component of the signal to the primary winding 244. Resistor 340 may be a varistor in order to compensate for the effect of temperature variations of the DC resistance of primary winding 244. The parallel combination of capacitor 342 and resistor 340 are connected through a filter circuit 344 to one terminal of primary winding 244, the other terminal of which is connected to signal ground.

The excitation of primary winding 244, by the previously described circuitry, creates a magnetic flux which is coupled by the transformer coupling member 242 to the secondary winding 246 which will cause a signal to develop across the secondary winding. The secondary winding 246 is connected between line 268 and signal ground. Line 268 is connected to one terminal of a series capacitor 346 in order to couple only the AC components of the signal developed across secondary winding 246 to the remaining portions of the circuit. A second terminal 349 of capacitor 346 is connected to a capacitor 348 which provides a high frequency shunt to ground to reduce high frequency noise induced into the windings 244, 246. Terminal 349 is connected to the input of buffer amplifier 270 through a series combination of a gain-adjusting resistor 350 and a resistor 352.

The buffer amplifier 270 includes an amplifier 356 having an inverting input 354 to receive the signal from resistor 352. Amplifier 356 further has a non-inverting input 358 connected to a constant voltage source, provided by a voltage divider consisting of resistors 360 and 362 connected in series between V+ and signal ground in order to impart a fixed DC bias to the signal. A feedback circuit, consisting of a parallel combination of a resistor 364 and capacitor 366, is connected between output 368 of the amplifier and its inverting input 354. In this configuration, buffer amplifier 270 provides a high input impedance for the low signal level developed across the secondary winding 246 and amplifies the signal. The output of the amplifier 270 is AC coupled by a series capacitor 370 and a resistor 378 to an input 272 of the precision rectifier 274.

The precision rectifier 274 includes an operational amplifier 372 having a non-inverting input 374 connected to ground through a resistor 375. An inverting input 376 is coupled to the signal on the line 272. A diode 380 is provided as a feedback path between an output 382 and input 376 of amplifier 372 and serves to cause amplifier 372 to conduct positive going portions of the AC signal seen at the secondary of the transformer but to not conduct the negative going portions. In addition, output 382 is further connected through a forward biased diode 384 and a resistor 386 to output line 276. Diode 384 is additionally connected to inverting input 376 through a resistor 388. This configuration provides a forward voltage drop that is substantially reduced from that of a conventional rectifier by essentially dividing the forward voltage drop by the open loop gain of amplifier 372. Additionally, this configuration provides exceptional temperature stability through the use of a pair of oppositely poled diodes in the feedback loop.

Line 276 from the precision rectifier 274 is provided to DC amplifier 278, which includes an amplifier 390. Output 276 is connected to the non-inverting input of amplifier 390. An inverting input 392 of amplifier 390 is connected through a series resistor 394 to a voltage divider consisting of resistors 395, 396, 397, and 398 serially connected between VCC and signal ground. Resistor 397 is adjustable and provides means for adjusting the DC offset on the output of amplifier 390, which is provided on line 399. A parallel combination of a resistor 400 and a capacitor 402 is connected as a feedback path between output 399 and inverting input 392 and establishes the gain characteristics of amplifier 390 while providing low pass filtering characteristics to reduce AC ripple on output line 399. Output 399 of DC amplifier 278 is connected through a resistor 404 to output line 280 which is, in turn, connected to an output pin 406 of connector 229. A diode 408 between output line 280 and signal ground provides a reverse voltage clamp to eliminate excessive negative voltage swings that otherwise could be passed to the ride control computer. Additional low pass output filtering is provided by capacitors 409 and 410.

Output 260 of square wave generator 258 is additionally connected to the non-inverting input of an amplifier 412 whose inverting input 414 is maintained at a constant voltage level by a voltage divider comprising resistors 416 and 418 connected in series between VCC and ground. Amplifier 412 provides a low impedance source for providing a cyclically varying signal to a rectifier circuit 282 including series capacitor 420, series diode 422, shunt diode 424, and shunt capacitor 426. The output of rectifier circuit 282 is provided on line 282 as a DC voltage which is negative with respect to signal ground. Negative voltage line 283 is provided as a supply voltage to amplifiers 372 and 390 in addition to the positive voltage supplied to these amplifiers from V+. In this manner, amplifiers 372 and 390 are capable of operating in a linear region even at small signal levels and the DC offset on output line 399 of amplifier 390 may be adjustable to zero and even a negative voltage, if desire. An additional advantage of providing a negative voltage supply to amplifiers 372 and 390 is that an internal failure of either amplifier may result in a negative voltage in output line 399 which could be interpreted by the ride control computer as an indication of a malfunctioning of the control module.

Operation

In operation, a square wave of stable frequency and amplitude is produced by square wave generator 258 on line 260, which includes a low frequency component and harmonically-related higher frequency components, and is scaled by resistors 301 and 302. The scaled square wave is converted to a low-distortion sine wave by the active-load, high frequency shunt action of sine wave shaper 262. Sine wave shaper 262 provides a low-impedance shunt for the higher frequency components and a high-impedance load to the low frequency signal component of the square wave, as well as serves to refine the shape of the resulting signal. Therefore, a low distortion, stable amplitude sine wave is produced. This sine wave signal is amplified by amplifier and driver 266 and is provided to primary winding 244 through resistor 340, capacitor 342, and filter 344.

The excitation of primary winding 244 induces a spirally looping current in tubular conductor 243. In turn, the looping current in the tubular conductor 243 causes a voltage to be induced in the secondary winding 246 that is proportional to the length of the winding assembly distal portion 236 that is telescoped within the tubular conductor 243. Thus, the tubular conductor 243 provides the transformer coupling between the primary and secondary windings. The voltage developed across secondary winding 246 is amplified by buffer amplifier 270 and rectified to a DC level, equal to the average value of the AC signal, by precision rectifier 274. The output of precision rectifier 274 is amplified and further filter by amplifier 278. The gain of the control module may be adjusted by adjusting resistor 350 and the offset of the output signal on pin 406 may be adjusted by adjusting resistor 397.

Figure 24:
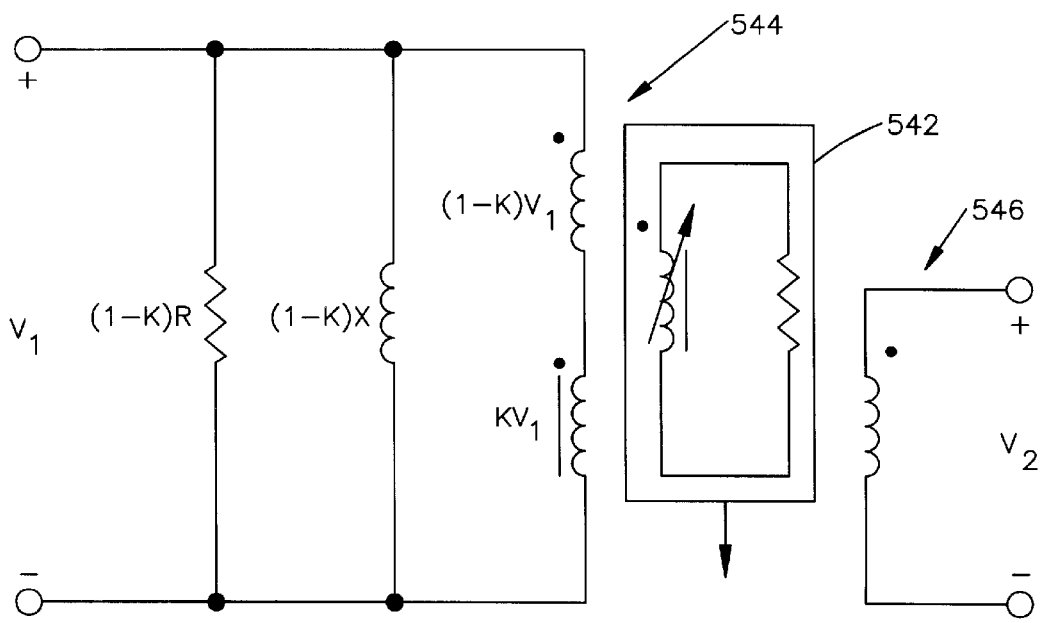
FIG. 24 is a diagram illustrating the equivalent circuit for a sensor probe according to the embodiment in FIGS. 20–22.
Figure 20:
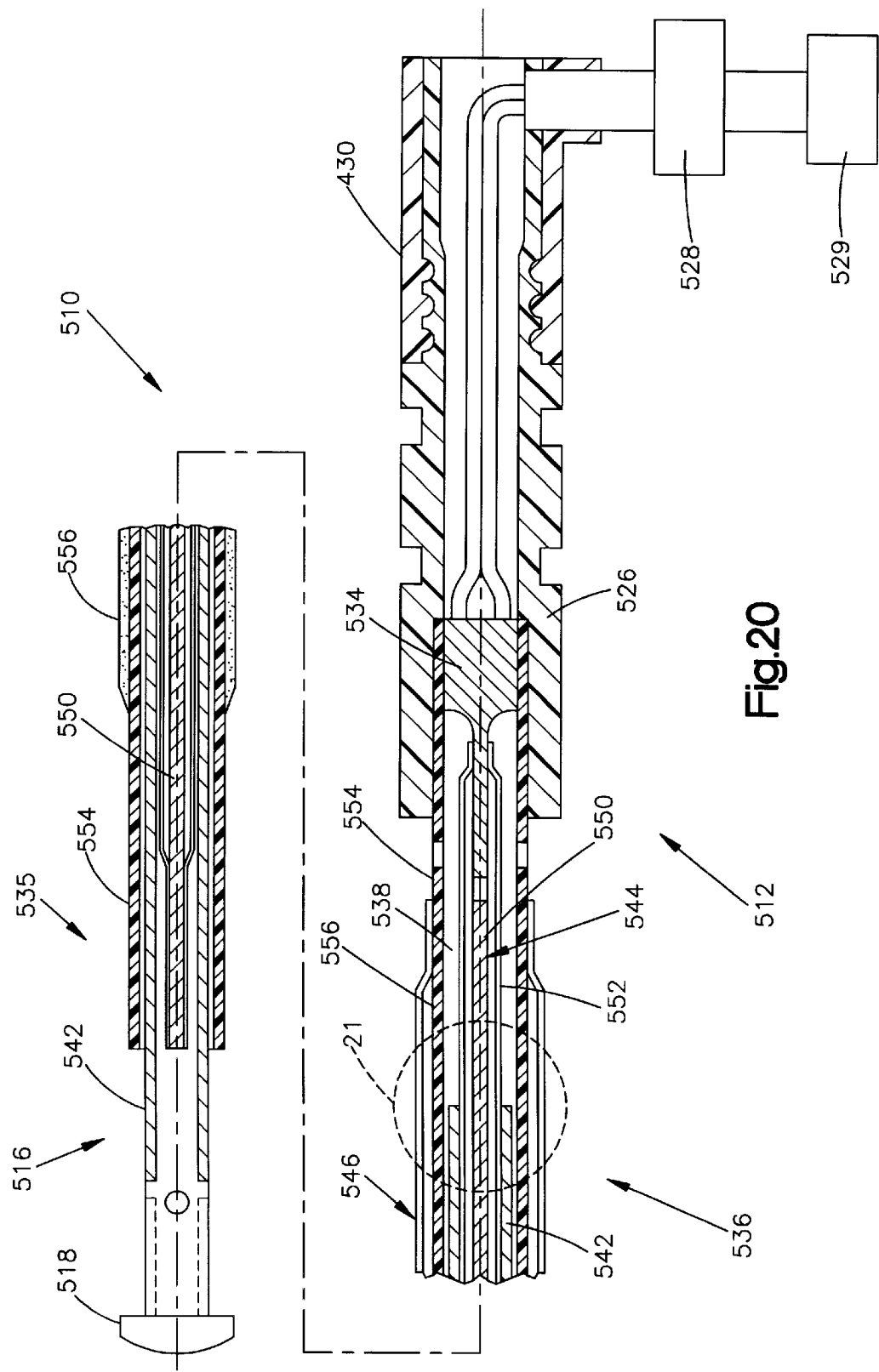
FIG. 20 is a sectional side view of a second embodiment of the invention.

The effect of the tubular conductor 243 of the sensing portion 236 of the winding assembly is illustrated by reference to FIG. 24, in which:

K represents the forward voltage transfer ratio

R is the effective input resistance of the sensor

X is the effective sensor input reactance $V_1$ is the input voltage signal provided to the primary winding 244

$V_2$ is the output voltage signal developed across the secondary winding 246.

$I_s$ is the looping current induced in tubular conductor 243.

Windings 244 and 246 are long, slender coils. A current in such a coil causes a magnetic flux that is dense inside the coil and decreases with distance rapidly outside of the coil. Therefore, except for the effect of tubular conductor 243, essentially no signal $V_2$ would be developed across winding 246 in response to the excitation of winding 244 because the windings are side-by-side. As tubular portion 242 overlaps a portion of the winding assembly, the magnetic flux produced by the primary winding links the tube, which induces a looping current in the tube. This induced current produces a flux within the tube, which is opposite to and partially cancels the primary flux. If the counter-flux is, for example, 0.3 times the original flux in the primary coil, the flux within the primary coil will be at its original amplitude within the non-overlapped length, but at only 70% of its original amplitude within the overlapping portion. This will reduce both R and X, which will respond as though the overlapped portion of the primary winding were partially shorted, or removed from the circuit.

Since the same length of secondary winding 246 is within the tubular conductor 242, this portion of the secondary winding will experience, in this example, a flux that is 30% of the original flux amplitude in the primary while the non-covered portion of the secondary will experience essentially no flux. $V_2$ is directly proportional to $V_1$ times the ratio of flux in the secondary to the flux produced by the primary. The result is a voltage induced across the secondary that is proportional to the length of the winding assembly that is within the tubular portion 242.

In the preferred design illustrated in FIGS. 13–23 the coupling member is constructed from a conductive tube, preferably aluminum. The winding assembly 232 fits within the confines of the tubular conductor 243 to a greater or lesser extent depending upon the relative positioning of the wheel assembly and vehicle chassis.

Alternative Coupling Embodiment

In accordance with an alternate embodiment of the invention shown in FIGS. 20–24 the primary and secondary windings are positioned one within the other and separated by a cavity, or gap, and a coupling adjustment means includes a coupling disrupter member longitudinally positionable between the windings in the gap. In this embodiment, as the coupling adjustment means and the sensing probe become more telescopingly coextensive, the voltage developed across the secondary winding, as a result of the voltage applied to the primary winding, decreases because the coupling adjustment means inhibits, or reduces, the amount of transformer coupling between the windings.

In this embodiment, a non-contact linear position sensor assembly 510 includes a base portion 512 and a tracking portion 516, which are mutually longitudinally telescopingly positionable with respect to each other. Base portion 512 includes attachment means (not shown) for attachment thereof to a stationary portion of the vehicle and tracking portion 516 includes attachment means 518 for attachment to a movable portion of the vehicle, such as a wheel assembly. Base portion 512 includes a sensing portion 536 including a primary winding 544 comprising a coil 552 spirally wound around the axis of the core 550 (FIGS. 28, 29, and 30). Primary winding 544 is seen to be positioned within a secondary winding 546 which includes a core 554 having a wall defining a central bore that has an inner diameter that is substantially larger than the outer diameter of core 550. Secondary winding 546 further includes a coil 556 wound about the axis of the core 554. The dimensions of the primary and secondary windings are selected in order to define a cavity or gap 538 between the primary and secondary windings. A tubular portion 542 of tracking portion 516 is longitudinally positionable within the gap 538. Tubular portion 542 and sensing portion 536 define a sensing probe 535.

Core 550 includes an enlarged end portion 534 which is sized to frictionally engage core 554 which, in turn, is sized to frictionally engage a frame member 526 included in base portion 512 (FIG. 28). Position sensor 510 further includes a stress relief member 430 which engages frame 526 and supports a plurality of electrical leads extending to a control module 528 which, in turn, is connected by an electrical connector 529 to the ride control computer (not shown).

Core 550 is made from a ferromagnetic material, such as iron, and the secondary core 554 is made from a non-magnetic material, such as a structural polymer. As best seen in FIG. 28, the primary and secondary coils do not extend the entire length of their respective cores. Rather, the coils are positioned on their respective cores in a manner that will provide interface between the coupling means and the coils over the entire extent of travel of tubular portion 542, plus an additional length of the core equal to approximately 10 percent of the inner primary coil and 5 percent of the outer secondary coil. Primary and secondary windings are each spirally wound around their respective cores from a single length of wire and are each covered by a protective film such as a Mylar sleeve or other insulating material.

Because primary winding 544 is positioned within secondary units 546, excitation of the primary winding by a voltage $V_1$ induces a voltage $V_2$ in the secondary winding (FIG. 32). The coupling adjustment member in this embodiment, which is defined by tubular portion 542, operates as a magnetic shield which interrupts this transformer coupling between primary winding 544 and secondary winding 546. Tubular portion 542 creates a variable reluctance path for the magnetic flux. This variable reluctance path proportionately decreases the amount of current induced into the secondary winding. The flux available for inducing a voltage in the secondary winding is proportional to the length of gap 538 in which the tubular portion 542 is absent. Accordingly, as tubular portion 542 is additionally telescopingly extended within gap 538, the magnetic shielding effect of the tubular portion reduces the magnetic coupling between the windings, which reduces the voltage developed across the secondary winding from the signal applied to the primary winding. Therefore, the output signal from the sensing probe responds to the relative positioning of the position sensor portions in the opposite manner to that described in the embodiment illustrated in FIGS. 13–22. In the illustrated embodiment, tubular portion 542 is made from a magnetic metal such as iron. However, nonferrous and even nonmagnetic materials can be used so long as the tubing has an effect on the transformer coupling.

Figure 17:
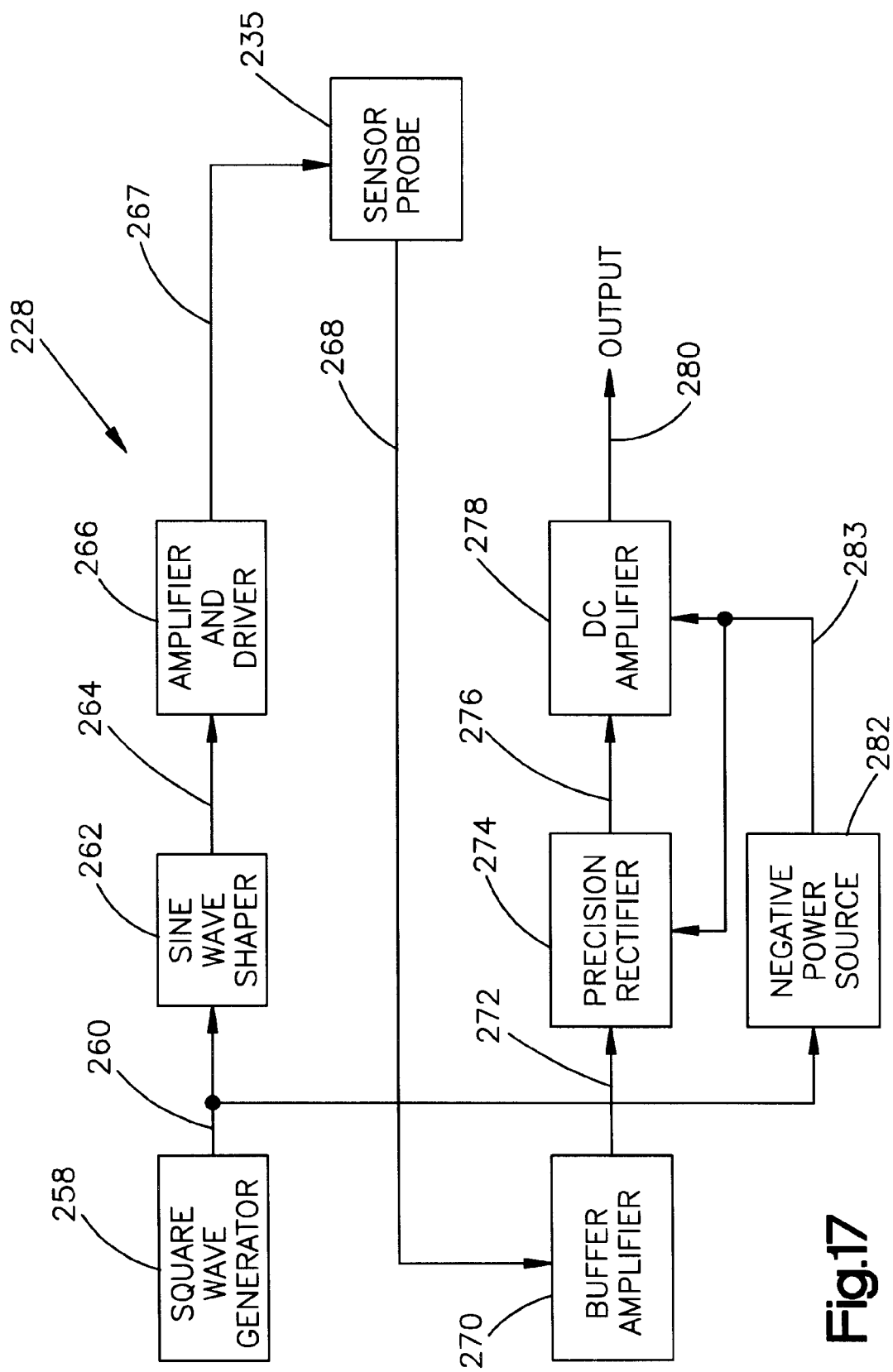
FIG. 17 is an electrical circuit diagram in block form of the electrical control circuit of the invention.

The control module 528, provided with this embodiment, as illustrated in FIG. 23, is essentially the same as that disclosed in FIGS. 16 and 17, with the addition of an inverting amplifier 432 connected with the output 280 of DC amplifier 278. Inverting amplifier 432 includes an operational amplifier 434 having a feedback resistor 436 extending between an output 438 of the amplifier and an inverting input 440, in order to establish its gain. The non-inverting input 441 of amplifier 432 is provided with a constant voltage level through a voltage divider, comprising resistors 444, 445, and 446 series connected between VCC and ground, and a series resistor 442. In the embodiment illustrated in FIG. 23, resistor 445 is adjustable. Amplifier 434 is supplied with both a positive voltage V+ and a negative voltage, the latter from line 283.

Second Alternative Embodiment

An additional embodiment of the invention adapted for use with a vehicle ride control system is illustrated in FIGS. 25 and 26. This embodiment has the same electrical configuration and operates in the same manner as the embodiment illustrated in FIGS. 13–19 with the principal exception that the length of the primary and secondary winding is reduced to 4.8 inches in the illustrated embodiment.

A linear position sensor assembly generally illustrated at 610 includes a base portion 612 attached by an attachment member 614 to one portion of a vehicle, such as the vehicle chassis, and a tracking portion 616 which is attached to the portion of the vehicle whose position it is desired to sense, such as a wheel support assembly by a second attachment member 618 (FIG. 25). Tracking and base portions 616 and 612 are relatively longitudinally movable with respect to each other and are flexibly closed by a longitudinally flexible boot 620. The boot 620 includes a first end 622 sealingly engaged with base portion 612 by any suitable clamping means, such as a cable tie 700 and a second end 624 sealingly engaged with tracking portion 616 by any suitable clamping means, such as a cable tie (not shown).

Base portion 612 includes a frame 626 and a control module 228 incorporated within frame 626 in a common package such as by encapsulation with a suitable encapsulating material that is resistant to various automotive fluids. An electrical connector 629 adapted to engage a mating connector (not shown) for connection to the ride control computer provides input and output interconnection for control module 228. Frame 626 includes an inner surface 627 defining an internal circular chamber 630 in which a winding assembly 632 is firmly positioned. Winding assembly 632 includes primary and secondary windings 644 and 646 that are enclosed by a structural polymer shell 648 and has an end portion 634 dimensioned to frictionally engage surface 627. Winding assembly 632 further has a sensing portion 636 spaced from surface 627 to define an annular cavity or gap 638 there between. Tracking portion 616 includes an end portion 640 to which attachment member 618 is affixed and coupling adjustment means comprising an elongated tubular portion 642.

Tubular portion 642 is configured to freely slide within gap 638 between sensing portion 636 of the winding assembly 632 and surface 627. Tubular portion 642 includes a nonferrous metal transformer coupling member 695 tightly fitted within a polymeric support tube 696. A plurality of ribs 697 are annularly spaced around the outer surface of tube 696 and provide low friction guide means for slidable engagement with surface 627 (FIG. 25). A plurality of openings 698 extend through a wall portion of frame 626 and provide air flow means for equalizing the pressure within gap 638 as tubular portion 642 longitudinally moves therein.

Representative values of various components in the illustrated embodiment of the circuit of FIGS. 22 and 23 are disclosed in U.S. Pat. No. 5,216,364 which is incorporated herein.

The present invention is readily adaptable to low cost automated assembly. The windings may be spirally positioned on the respective cores merely by rotating of the cores while applying the wire turns by a numerically controlled apparatus. The output characteristics of the sensor assembly, with respect to the relative positioning of the sensor probe portions, may be adjusted by selectively adjusting the turn-spacing of the coils along various portions of the respective cores. This versatility allows the position sensor to be "tuned" to the characteristics of a particular vehicle's suspension system. The ability to combine the packaging of the sensing probe and electronic module allows adjustment to the electronic circuitry, such as gain and offset, to be made at the factory before the components are encapsulated. Thereafter, the position sensor assembly may be easily positioned on the vehicle and connected to the ride control computer without additional adjustment in the field. The structure of the various components additionally reduces weight and bulk and enhances the durability of the assembly. The unique aspects of the control module according to the invention provides a reduced component count which further improves the compactness of the assembly and, along with the superior temperature stability of the circuit, allows an entire sensor probe to be positioned within a harsh environment. Furthermore, the components of the sensor probe can be adapted for a lubricous sliding interfit provided by a hydraulic fluid of a shock absorber in which the sensor can be located with no effect on sensor performance.

A linear position sensor assembly according to the invention may be made responsive over 90 percent of the stroke length of the tracking portion with respect to the base portion. Thus, space occupied by the assembly is substantially reduced. In addition to positioning within a shock absorber, the invention may be adapted to mounting external to a shock absorber parallel to the direction of its travel. The invention may additionally find application in sensing the position of portions of an automotive vehicle other than the suspension system and may be applied to non-vehicular uses such as use with machine tools and the like.

The linear position sensor provides an output voltage that is proportional to the mechanical displacement length of the sensor. When the sensor is in the fully compressed state, the output voltage will be at a designated level. Conversely, when the sensor is in the fully extended state, the output voltage will also be at another designated level. In the preferred embodiment the output voltage response of the sensor is desired to be linear through the range of full compression to full extension. In alternate embodiments the output voltage versus displacement could have any relationship.

The results obtained by the alternate embodiments described thus far are illustrated in FIG. 16. By reference to this figure, it is seen that the signal developed across the secondary winding, which is directly proportional to the voltage transfer ratio, is substantially linearly related to the amount of overlap of the tubular portion 242 with respect to sensing portion 236 of the winding assembly. Furthermore, an important feature is that the radially wound coils may be wound with a pre-established non-constant turn spacing, by a commercially available numerically controlled winding apparatus, in a manner that may substantially cancel any remaining nonlinearity and is within the capabilities of one skilled in the art. Alternatively, it may be desired to provide a particular characteristic nonlinear voltage transfer ratio for a particular application. The turn spacing may be arranged in order to "tune" the voltage transfer ratio to the desired characteristic.

To achieve the desired output signal linearity, full compression output voltage and full extension output voltage, there must be effort directed toward developing a specific winding profile of the wire coils placed on the sensor element. The winding profile provides variations of the turns-density of the coil placed on the sensor element's magnetically permeable core. The profile compensates for nonlinear variations in the response of the sensor element. Effort must also be directed in calibrating the output signal's absolute voltage with respect to battery ground. This is accomplished by changing the gain and offset of an output amplifier state. In doing so, the output voltage response can be positioned where specification requirements dictate.

Each of the embodiments disclosed above includes a coupling member for changing an output signal from the sensor which depends on a degree of over lap of the coupling member. Each sensor utilizes two telescoping co-linear tubular members, one within the other, which allow relative axial sliding movements between them. In the embodiment of FIG. 25 each of the tubular members has at its outside extremity an attachment socket for attachment to a small ball. The sensor is mounted between the sprung and unsprung masses on a vehicle suspension system by means of the attachment sockets and balls mounted on the sprung and unsprung masses.

In FIG. 21 the outer tubular member carries an elongated coil that is over molded with a plastic, providing protection. The inner tubular member 554 is comprised of a metal core 550 which is over molded with a plastic such that its outside diameter is less than the inside diameter of the tube 542.

The metal cylinder 552 is a coupling adjustment member that controls the linking of magnetic flux to the coil. Most transformer or inductor cores are ferromagnetic, being used to decrease the reluctance of a magnetic path. The metal cylinder of FIG. 21 performs the inverse function of a ferromagnetic core. It reduces the coupling or linking of magnetic flux to the coil. It does this by virtue of the eddy currents induced in the tube that oppose the flux produced by the applied current that sets up the field.

Alternate embodiments could use a single coil in which case the single coil could be a transformer. In this case it is an autotransformer. The entire length of the coil is a primary winding producing a magnetic flux in the core. The coils that are not overlapped by the metal cylinder are the secondary of output winding. It is these coils that determine the inductance of the sensor.

In a single coil embodiment, as the tubular member overlies more of the coil the effective number coils goes down since the flux produced by the current can only link with those coils that are not coextensive with the tube, i.e., the coils over the tube are blocked from linking with the flux produced by those turns. As the number of effective turns is reduced, the inductance goes down. Thus, the inductance of the transformer becomes a measure of the relative position of the tubular members and hence the distance between the sprung and unsprung masses on the motor vehicle.

A variety of circuits responsive to the varying inductance of the transformer could be used to indicate position. For example the inductance could be made part of an LC oscillator circuit. In this situation, an intermediate output of the circuit is a variable frequency inversely proportional to the square root of the inductance. This variable frequency is then demodulated to produce a DC voltage inversely proportional to the distance between the sprung and unsprung masses of the motor vehicle.

In the illustrated embodiments monitoring electronics is carried by a housing positioned at one end of the linear position sensor. The electronics can include an oscillator circuit, a demodulating frequency to voltage converter and an output amplifier. Additional wiring can be used to connect the control module to a ground connection and to the ride control computer.

Transformer coupling in electrical engineering terms means that magnetic flux links the winding or windings of a coil or coils. The majority of power transformers use electrically isolated primary and secondary windings wound on a ferromagnetic core. The primary coil is connected to a source of alternating current. This current then produces an alternating flux in the core, which in turn induces a voltage in the secondary winding. The purpose of the power transformer is to step up or step down the primary voltage and supply that voltage to a load.

However, not all transformers are made this way. The autotransformer has a single winding wound on a closed ferromagnetic core. Autotransformers are used when isolation between the input circuit and the output circuit is not required. To obtain a voltage different than the input voltage, the coil of the autotransformer may be tapped at different locations along the coil's length relative to ground. The single coil of the autotransformer is both the primary and the secondary.

Thus, multiple coils are not a necessary condition for transformer coupling. The coupling referred to in transformer coupling is the coupling or linking of magnetic flux to a coil. Any conductive coil when connected to a voltage source produces a current in the coil which in turn produces a magnetic field that links its own winding.

In a single coil embodiment of the disclosed linear position sensor, when the coil is connected to a voltage source, it produces a magnetic field that links or couples the field with its own coils. The tubular element, which extends variably along the extent of the coil, is a coupling adjustment member that reduces the flux that links or couples with the coil. It does this because the alternating magnetic field of the coil induces eddy currents in the metal cylinder that oppose the flux generated by the applied current in accordance with Lenz' Law. As the coupling adjustment member moves farther into the coil the effective length of the coil is reduced, lowering the inductance and increasing the frequency of the oscillator circuit supplying current to the coil. Thus, the single coil is at once both the primary coil supplying the magnetic field and sensor or secondary coil providing a measure of the length of the insertion of the tube into the coil. This is similar to the autotransformer whose single winding supplies magnetic flux and simultaneously supplies current to a load, i.e. simultaneously the primary and secondary winding.

The fundamental principle of operation is that magnetic flux is linked to a sensing coil and that a coupling adjustment means is used to vary the linking and hence the output of the sensor coil.

While the invention has been described with a degree of particularity it is the intent that the invention include all modifications and alterations from the disclosed design falling within the spirit or scope of the appended claims.

What is claimed:

1. For use with a motor vehicle having at least one fluid-pressurized height adjusting member having first and second separable components, vehicle ride height control apparatus comprising:
   a) at least one position sensor which provides output signals related to extent of separation of first and second separable components of at least one fluid-pressurized height adjusting member;
   b) at least one fluid pressure sensor which provides output signals related to a pressure in said at least one fluid-pressurized height-adjusting member;
   c) monitoring circuitry to electronically interface with at least one position sensor and at least one fluid pressure sensor;

d) electronic output circuitry to actuate one or more fluid flow valves which apply pressure to said at least one fluid-pressurized height adjusting member to actuate raising thereof and wherein said one or more fluid flow valves release pressure from said at least one fluid-pressurized height adjusting member to actuate lowering thereof;

e) a fluid pressure source which provides fluid power to the at least one fluid-pressurized height adjusting member; and f) electronic circuitry incorporating control instructions for activating vehicle height control output functions in response to vehicle input signals.

2. The apparatus of claim 1 additionally comprising at least one vehicle height adjusting member and wherein the position sensor comprises first and second elongated sensor members that are connected to first and second separable components of said at least one fluid-pressurized height-adjusting member.

3. The apparatus of claim 2 wherein the one vehicle height adjusting member comprises an air spring and wherein at least one of the first and second elongated sensor members extends through an interior region of said air spring bounded by generally cylindrical flexible walls of said air spring.

4. The apparatus of claim 2 wherein one of the elongated position sensor members comprises a transformer coil which when energized creates a magnetic field which induces a signal from the sensor which is coupled to said monitoring circuitry.

5. The apparatus of claim 1 additionally comprising at least one fluid-pressurized height adjusting member and wherein the position sensor comprises an ultrasonic transducer that sends a signal which monitors separation between first and second separable components of said at least one fluid-pressurized height-adjusting member.

6. The apparatus of claim 5 wherein the height adjusting member is an air spring and the ultrasonic transducer is mounted to one of the first and second separable components and emits a signal through an interior region of said air spring and wherein a return signal is converted to an electronic signal for use by the monitoring circuitry.

7. For use with a motor vehicle having at least one fluid-pressurized height adjusting member having first and second separable components, a vehicle ride height control method comprising:

a) monitoring an output from at least one position sensor which provides output signals related to extent of separation of said first and second separable components of at least one fluid pressurized height adjusting member;

b) monitoring an output from at least one fluid pressure sensor which provides output signals related to said at least one fluid-pressurized height-adjusting member;

c) actuating one or more fluid flow valves which apply pressure to said at least one fluid-pressurized height adjusting member to actuate raising and lowering of a portion of the motor vehicle with respect to a road surface; and d) controlling at least one fluid pressure pump to provide system fluid power for pressurizing the height adjusting member.

8. The method of claim 7 comprising the step of connecting a position sensor having first and second elongated sensor members to first and second separable components of said at least one fluid-pressurized height-adjusting member to monitor the separation between the first and second separable components.

9. The method of claim 8 wherein the one vehicle height adjusting member comprises an air spring and wherein at least one of the first and second elongated sensor members is positioned to extend through an interior region of said air spring bounded by generally cylindrical flexible walls of said air spring.

10. The method of claim 8 wherein one of the elongated position sensor members comprises a transformer coil further comprising the step of energizing the transformer coil to create a magnetic field which induces a signal from the sensor which is coupled to said monitoring circuitry.

11. The method of claim 7 wherein the position sensor comprises an ultrasonic transducer and further comprising the step of emitting a signal from the ultrasonic transducer and interpreting a return signal to monitor a separation between first and second separable components of said at least one fluid-pressurized height-adjusting member.

12. The method of claim 11 wherein the height adjusting member is an air spring and the ultrasonic transducer is mounted to one of the first and second separable components and emits a signal through an interior region of said air spring and wherein a return signal is converted to an electronic signal for use in monitoring the separation between the air spring components.

* * * * *